United States Patent
Odagawa

(10) Patent No.: US 7,110,007 B2
(45) Date of Patent: Sep. 19, 2006

(54) IMAGE PROCESSING APPARATUS AND METHOD

(75) Inventor: Masayuki Odagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 10/180,051

(22) Filed: Jun. 27, 2002

(65) Prior Publication Data

US 2003/0016235 A1 Jan. 23, 2003

(30) Foreign Application Priority Data

Jun. 28, 2001 (JP) ............................. 2001-196749
Jul. 4, 2001 (JP) ............................. 2001-203768
Jun. 13, 2002 (JP) ............................. 2002-173029

(51) Int. Cl.
*G09G 5/00* (2006.01)
*G06K 9/34* (2006.01)

(52) U.S. Cl. ...................................... 345/634; 382/175

(58) Field of Classification Search ........ 345/629–640; 382/175
See application file for complete search history.

(56) References Cited

U.S. PATENT DOCUMENTS

| | | | | |
|---|---|---|---|---|
| 5,315,691 A | * | 5/1994 | Sumiya et al. ................ 358/1.9 |
| 5,418,535 A | * | 5/1995 | Masucci et al. ............ 342/185 |
| 5,457,753 A | * | 10/1995 | Sasahara ..................... 382/275 |
| 5,732,230 A | * | 3/1998 | Cullen et al. ................ 715/764 |
| 5,737,031 A | * | 4/1998 | Tzidon et al. .............. 348/587 |
| 5,754,186 A | * | 5/1998 | Tam et al. ................... 345/629 |
| 5,864,342 A | * | 1/1999 | Kajiya et al. ............... 345/418 |
| 5,969,704 A | * | 10/1999 | Green et al. ................. 345/634 |
| 5,990,904 A | * | 11/1999 | Griffin ........................ 345/631 |
| 6,023,301 A | * | 2/2000 | Katata et al. ............... 348/586 |
| 6,084,914 A | * | 7/2000 | Katata et al. ............... 375/240 |
| 6,111,984 A | * | 8/2000 | Fukasawa .................... 382/209 |
| 6,151,421 A | * | 11/2000 | Yamada ...................... 382/284 |
| 6,208,360 B1 | * | 3/2001 | Doi et al. ................... 345/474 |
| 6,245,982 B1 | * | 6/2001 | Suzuki et al. ............. 84/477 R |
| 6,331,860 B1 | * | 12/2001 | Knox .......................... 345/620 |
| 6,335,985 B1 | * | 1/2002 | Sambonsugi et al. ....... 382/190 |
| 6,493,469 B1 | * | 12/2002 | Taylor et al. ............... 382/284 |
| 6,515,760 B1 | * | 2/2003 | Lourette et al. ........... 358/1.18 |
| 6,556,711 B1 | * | 4/2003 | Koga et al. ................ 382/173 |
| 6,559,855 B1 | * | 5/2003 | Kawase et al. ............ 345/596 |
| 6,587,593 B1 | * | 7/2003 | Matsuoka et al. .......... 382/260 |
| 6,714,676 B1 | * | 3/2004 | Yamagata et al. .......... 382/175 |
| 6,720,976 B1 | * | 4/2004 | Shimizu et al. ............ 345/629 |
| 6,753,878 B1 | * | 6/2004 | Heirich et al. ............. 345/629 |
| 6,798,834 B1 | * | 9/2004 | Murakami et al. ..... 375/240.12 |
| 6,863,400 B1 | * | 3/2005 | Liang ........................... 353/20 |
| 2001/0024297 A1 | * | 9/2001 | Nagumo et al. ............ 358/426 |
| 2001/0055028 A1 | * | 12/2001 | Oka ........................... 345/629 |
| 2001/0055430 A1 | * | 12/2001 | Takahashi et al. .......... 382/284 |
| 2002/0012452 A1 | * | 1/2002 | Van Overveld et al. .... 382/107 |
| 2002/0015039 A1 | * | 2/2002 | Moore ........................ 345/421 |
| 2002/0030694 A1 | * | 3/2002 | Ebihara et al. ............. 345/634 |
| 2002/0064307 A1 | * | 5/2002 | Koga et al. ................ 382/176 |

(Continued)

*Primary Examiner*—Kee M. Tung
*Assistant Examiner*—Aaron M. Richer
(74) *Attorney, Agent, or Firm*—Fitzpatrick, Cella, Harper & Scinto

(57) ABSTRACT

This invention relates to an image processing apparatus, image processing method, and program for combining an original image and another image. In this invention, an original image is segmented into a plurality of segmented images, and a segmented image to be combined is extracted from these segmented images. This extracted segmented image is combined with that segmented image of another image, which corresponds to the extracted segmented image.

15 Claims, 27 Drawing Sheets

U.S. PATENT DOCUMENTS

| | | | |
|---|---|---|---|
| 2002/0093516 A1* | 7/2002 | Brunner et al. | 345/629 |
| 2002/0167531 A1* | 11/2002 | Baudisch | 345/611 |
| 2003/0031346 A1* | 2/2003 | Prakash et al. | 382/106 |
| 2003/0189571 A1* | 10/2003 | MacInnis et al. | 345/505 |
| 2003/0193512 A1* | 10/2003 | Komagata | 345/629 |
| 2003/0219171 A1* | 11/2003 | Bender et al. | 382/278 |
| 2004/0005082 A1* | 1/2004 | Lee et al. | 382/103 |
| 2004/0008866 A1* | 1/2004 | Rhoads et al. | 382/100 |
| 2004/0042640 A1* | 3/2004 | Ikeda et al. | 382/115 |
| 2004/0066391 A1* | 4/2004 | Daily et al. | 345/629 |
| 2004/0080525 A1* | 4/2004 | Miller et al. | 345/716 |
| 2005/0047651 A1* | 3/2005 | Zheng | 382/162 |

\* cited by examiner

COORDINATES DO NOT MATCH
THOSE OF TILES AS OBJECTS OF COMBINATION

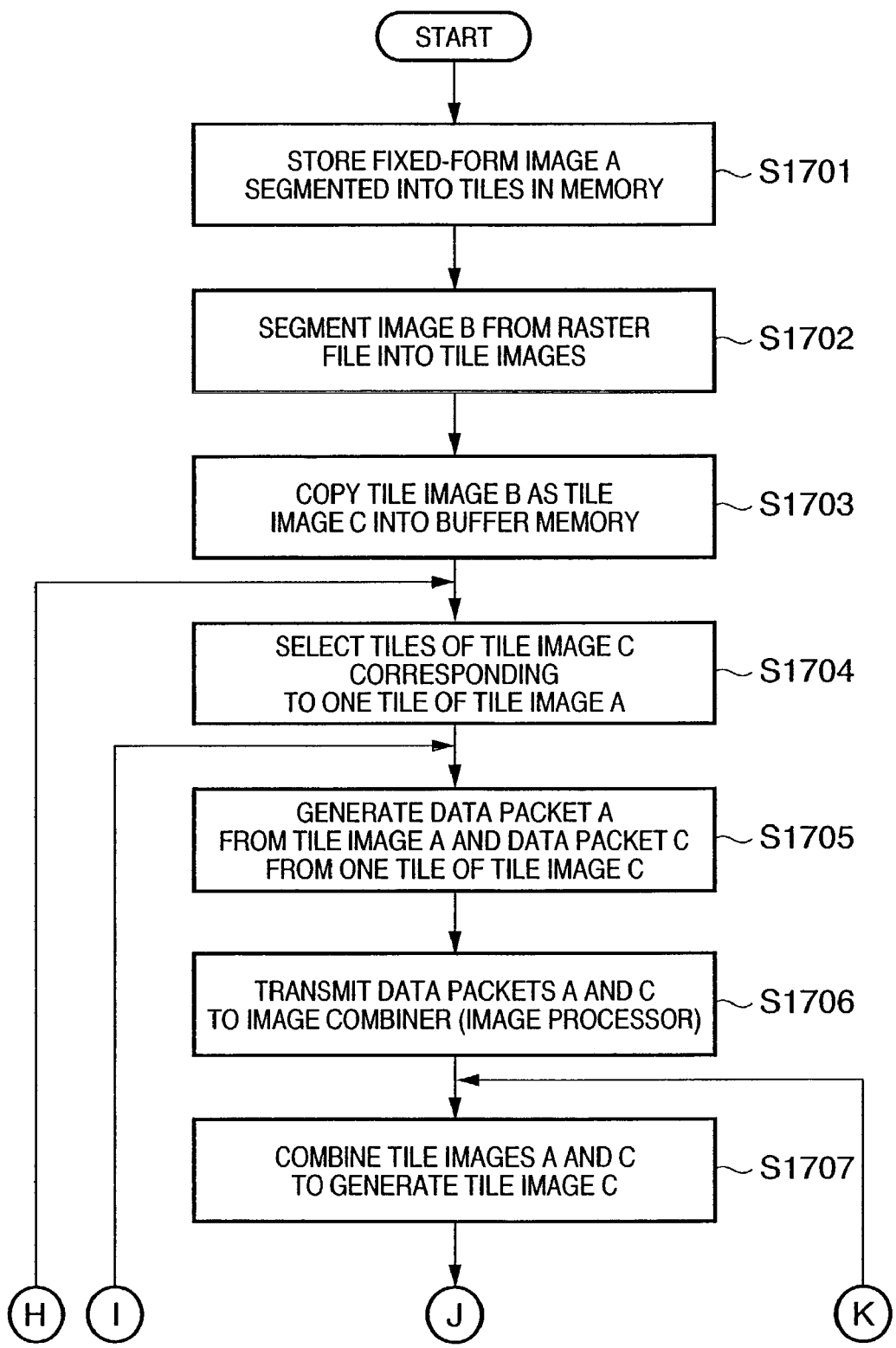

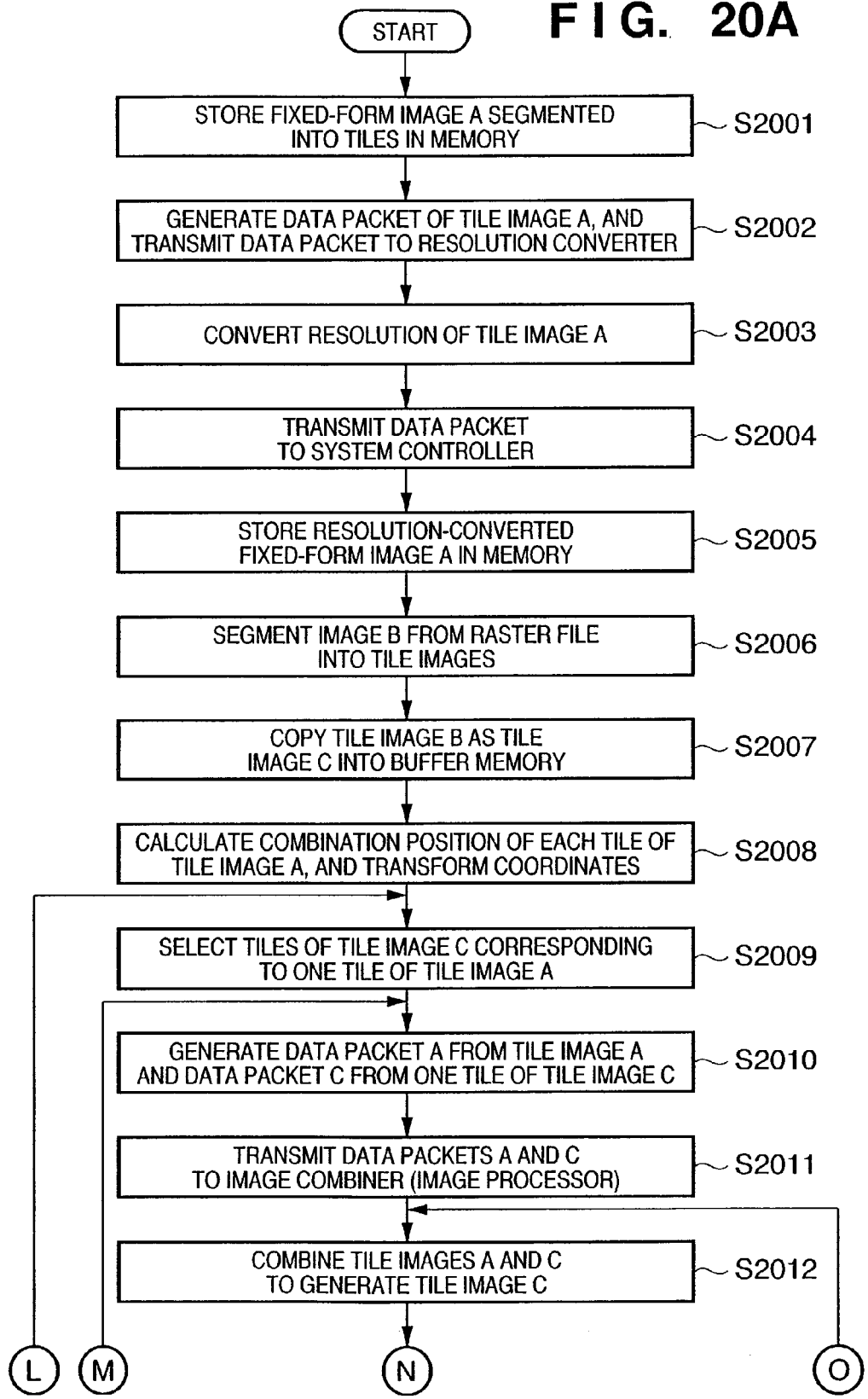

FIG. 22A
RESOLUTION CONVERSION
FIG. 22B
2201 ORIGINAL TILE A
2202 RESOLUTION-CONVERTED TILE A'
2203   2204
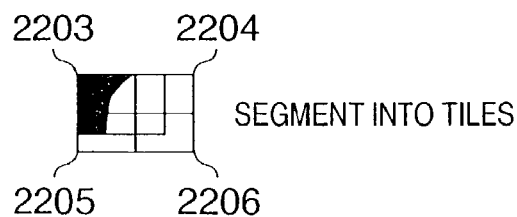
SEGMENT INTO TILES
2205   2206

IMAGE PROCESSING APPARATUS AND METHOD

BACKGROUND OF THE INVENTION

1. Field of the Invention

The present invention relates to an image processing apparatus and method of combining an original image and another image.

2. Background of the Invention

An image combining function is a useful function in information processing apparatuses such as a personal computer and in image processing apparatuses such as a scanner, printer, facsimile machine, copying machine, and digital composite machine having functions of these apparatuses. In a personal computer, for example, a CPU which executes predetermined image processing software functions as an image combining unit for executing image combination. Likewise, in a digital composite machine, an image processor included in a controller functions as an image combining unit.

Conventionally, these apparatuses combine a plurality of images by processing raster files of the whole images. For example, as shown in FIG. 23, raster files (images A and B) of whole images to be combined are input as objects to be processed to an image combining unit, and combined to obtain a combined image C.

Unfortunately, if entire images are used as objects to be combined as in the conventional apparatuses, portions which need not be combined are also processed as objects to be combined, so the combining process wastes time. In addition, since whole images are processed, the hardware resources necessary for the combination become enormous depending on the sizes of the images. Also, the control and management loads on a CPU during image combination increase.

SUMMARY OF THE INVENTION

The present invention has been made to solve the above problems, and has as its object to provide an image processing apparatus and method capable of combining a plurality of original images at high speed and low cost.

As a means for achieving this object, the present invention includes the following arrangement.

An image processing apparatus for combining an original image and another image comprises a segmenting section which segments the original image into a plurality of segmented images; an extracting section which extracts a segmented image to be combined from the plurality of segmented images; and a combining section which combines the segmented image extracted by the extracting section and that segmented image of the another image, which corresponds to the extracted segmented image.

It is another object of the present invention to provide an image processing apparatus and method capable of performing a combining process concerning a predetermined fixed-form image at high speed and low cost.

As a means for achieving this object, the present invention includes the following arrangement.

An image processing apparatus for combining a fixed-form image and a predetermined image comprises a storage section which stores a plurality of segmented images based on the fixed-form image; and a combining section which combines a segmented image stored in the storage section and that segmented image of the predetermined image, which corresponds to the combination position coordinates of the stored segmented image.

It is still another object of the present invention to provide an image processing apparatus and method capable of increasing the speed of form overlay printing without increasing the cost of the apparatus.

As a means for achieving this object, the present invention includes the following arrangement.

An image processing apparatus for performing a combining process for overlay printing comprises a storage section which stores a plurality of segmented images based on a form image; a segmenting section which segments printing data into a plurality of segmented printing data; and a combining section which combines a segmented image stored in the storage section and the segmented printing data corresponding to the combination position coordinates of the segmented image.

It is still another object of the present invention to provide an image processing apparatus and method capable of reducing the load on a CPU or the like which controls and manages combination.

As a means for achieving this object, the present invention includes the following arrangement.

An image processing apparatus for combining an original image and another image comprises a generating section which generates a packet by adding process information to a segmented image based on the original image; and a combining section which combines the segmented image contained in the packet and that segmented image of the another image, which corresponds to the segmented image contained in the packet, and the generating section generates a packet from a segmented image to be combined and transfers the generated packet to the combining section, and the combining section combines the segmented image contained in the transferred packet and that segmented image of the another image, which corresponds to the segmented image contained in the packet.

It is still another object of the present invention to provide an image processing apparatus and method capable of achieving high speed and low cost by distributing the load of combination to a CPU and a combining circuit.

As a means for achieving this object, the present invention includes the following arrangement. An image processing apparatus for combining an original image and another image comprises a processor which generates a packet by adding process information to a segmented image based on the original image; and a combining circuit for combining the segmented image contained in the packet and that segmented image of the another image, which corresponds to the segmented image contained in the packet, and a packet generating process performed using software by the processor and a combining process performed using hardware by the combining circuit are executed in parallel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 17A and 17B are flow charts for explaining the operation of a composite machine controller according to the third embodiment;

FIGS. 20A and 20B are flow charts for explaining the operation of a composite machine controller according to the fourth embodiment;

FIGS. 22A and 22B are views for explaining a case in which resolution conversion which enlarges the fixed-form image A is performed.

DETAILED DESCRIPTION OF THE PREFERRED EMBODIMENTS

Preferred embodiments of the present invention will now be described in detail in accordance with the accompanying drawings.

First Embodiment

Figure 1:
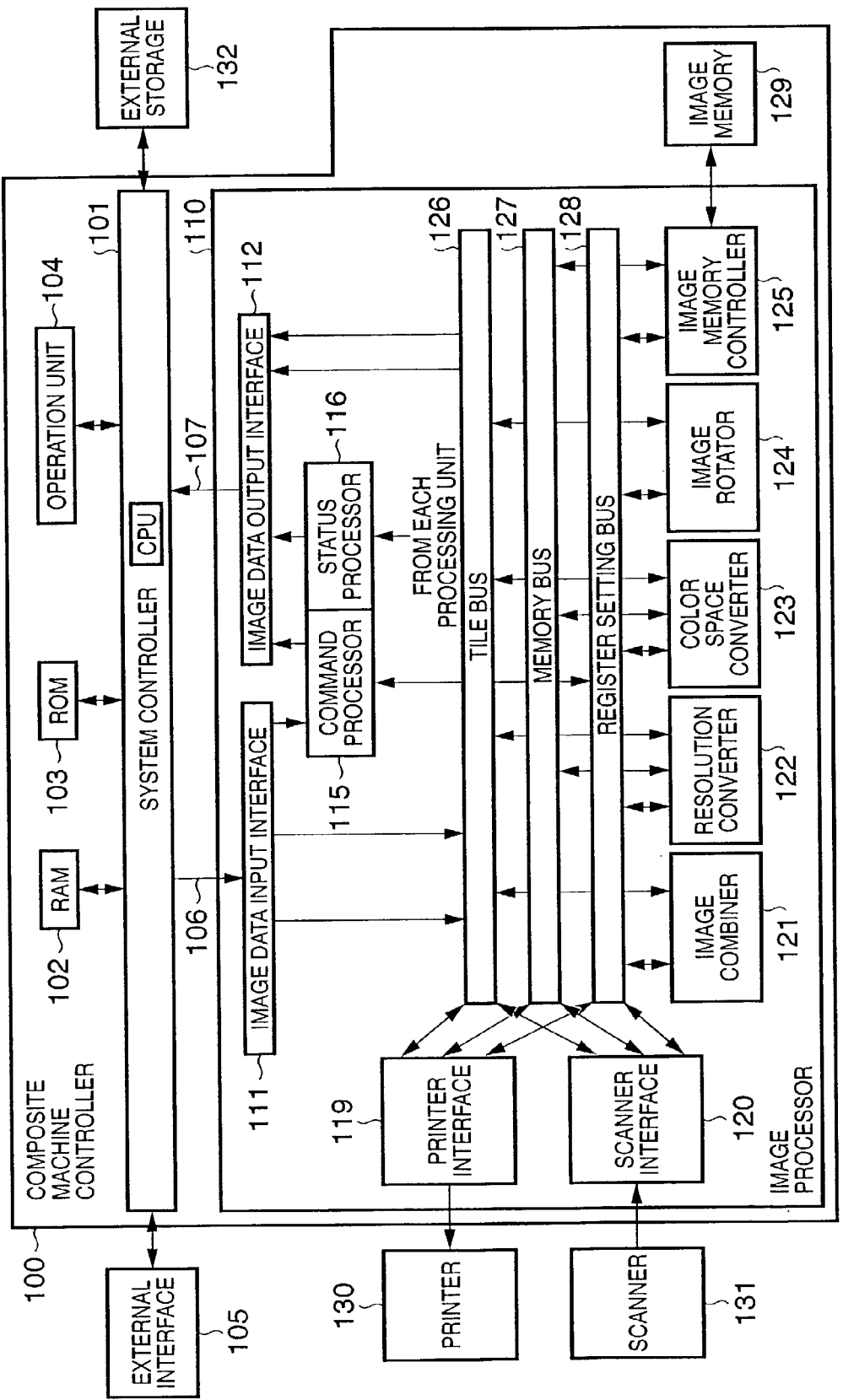
FIG. 1 is a block diagram showing the arrangement of a digital composite machine to which an image processing apparatus of the present invention is applicable.

FIG. 1 is a block diagram showing the arrangement of a digital composite machine to which an image processing apparatus of the present invention is applicable.

A composite machine controller 100 is connected to a scanner 131 as an image input section and a printer 130 as an image output section. Also, this composite machine controller 100 exchanges image data and the like with an external apparatus via an external interface 105 such as a network or a parallel interface. Examples of the external apparatus are a PC, printer server, and facsimile apparatus for transmitting printing data (code data) to be output from the printer 130, and another digital composite machine capable of exchanging images with this digital composite machine in order to perform remote copying or scan-once print-many operation.

A system controller 101 contains a CPU and controls the whole composite machine. The CPU can execute programs for image combination to be described later. A RAM 102 is a system work memory which allows the CPU of the system controller 101 to operate, and is also an image memory for temporarily storing image data. A ROM 103 is a boot ROM and stores a system boot program. An operation unit 104 is connected to the system controller 161 and provides a user interface.

Image rings 106 and 107 are buses which are formed by combining a pair of unidirectional connecting paths and which exchange data between the system controller 101 and an image processor 110. In this image processor 110, these image rings 106 and 107 are connected to a command processor 115, a status processor 116, and a tile bus 126 via an image data input interface 111 and an image data output interface 112, respectively.

The command processor 115 is connected to the image data input interface 111, the image data output interface 112, and a register setting bus 128. The command processor 115 interprets a command packet (to be described later) issued by the system controller 101 and input via the image ring 106, and accesses a register in each processing block designated by the command. Register write and read requested by the command are executed via the register setting bus 128. When performing register read, the command processor 115 generates a command packet from the readout information, and returns this generated command packet to the system controller 101 via the image data output interface 112.

The status processor 116 monitors the statuses of image data processors 121 to 124. In accordance with the status, the status processor 116 generates an interrupt packet (to be described later) for issuing an interrupt to the system controller 101, and outputs this interrupt packet to the image data output interface 112.

The tile bus switch 126 is connected to a scanner interface 120, a printer interface 119, an image combiner 121, a resolution converter 122, a color space converter 123, and an image rotator 124.

The scanner interface 120 receives output raster image data from the scanner 131, and converts the structure of the input raster image data into a tile-form image by a predetermined method set by the system controller 101 via the register setting bus 128. The scanner interface 120 also performs clock synchronization along with this conversion, and outputs the image data converted into tiles to the tile bus switch 126.

The printer interface 119 receives the tile image data from the tile bus switch 126, converts the structure into raster image data, changes the clock rate, and outputs the converted raster image data to the printer 130.

Note that the image processor 110 can also be used without being connected to the printer 130 and the scanner 131. In this case, a means for performing the format conversion between raster image data and tile image data performed by the scanner interface 120 and the printer interface 120 is additionally installed. Consequently, the scanner interface 120 and/or the printer interface 119 can be removed.

The image combiner 121 performs image combination for each tile image data. Details of this image combiner 121 will be described in detail later.

The resolution converter 122 changes the resolution of an image by using an image memory 129. The color converter 123 converts the color spaces of color images and grayscale images by using the image memory 129. The image rotator 124 rotates images.

An image memory controller 125 is connected to a memory bus 127 and the register setting bus 128. In accordance with requests from the individual image data processors 122, 123, and 124, the image memory controller 125 performs operations such as image data write and read access to the image memory 129.

An external storage 132 is constructed by an HDD (Hard Disk Drive) or the like, and is connected to the system controller 101. This external storage 132 also stores images to be combined, programs for operating the system, set information, and the like.

Figure 2A:
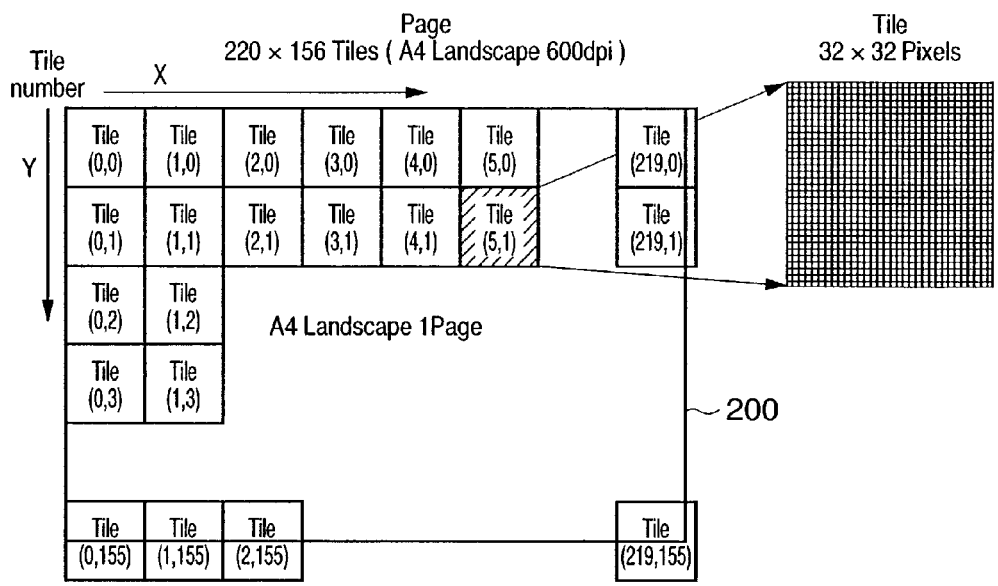
FIGS. 2A and 2B are views showing tile images.
Figure 2B:
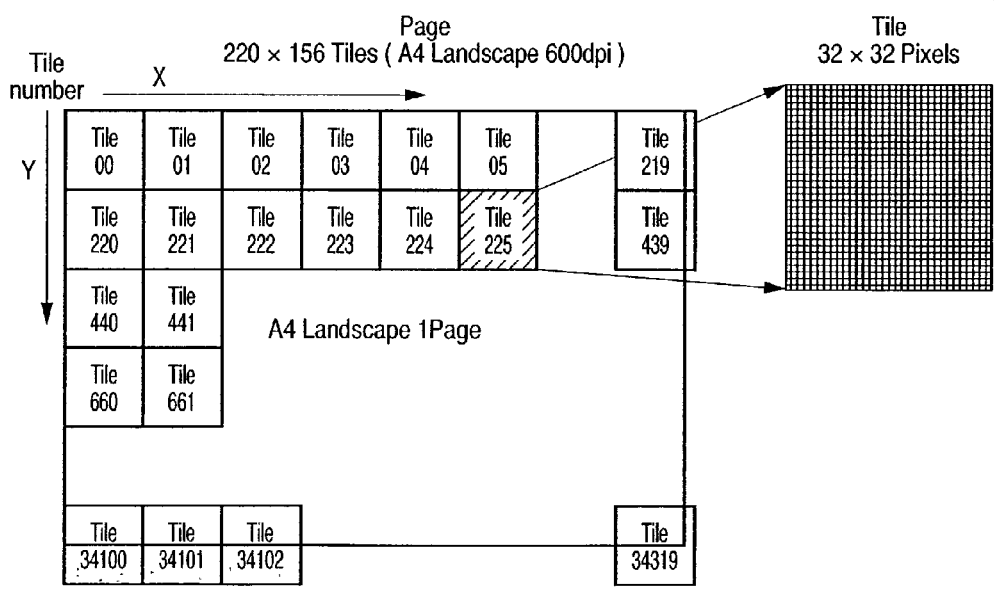

A tile image as the unit of processing in this embodiment will be explained below with reference to FIGS. 2A and 2B. As shown in FIGS. 2A and 2B, an image 200 of one page input as raster image data from the scanner 131 or the external interface 105 and stored as a file in the RAM 102 is segmented into a plurality of rectangular regions (tiles) by the system controller 101. Each tile region has a size of 32×32 pixels, and a tile image is generated in each region. Assuming that an A4-size original is scanned at a resolution of 600×600 dpi by the scanner 131 and the image is segmented into tiles each having 32×32 pixels, 34,320 tile images are generated from this A4-size original. As described previously, it is also possible to allow the scanner interface 120 having a similar function to perform this tile generating process.

By giving X- and Y-coordinates to these generated tile images, each tile image can be uniquely identified. Tile coordinates can be calculated from pixel coordinates as follows. For example, when tile positions are determined from the upper left corner as shown in FIG. 2A, this upper left corner is (0,0), and the coordinates and the X and Y components of tile positions increase along the directions of arrows X and Y, respectively. Tile (0,0) or the like in FIG. 2A indicates one tile, and the X- and Y-coordinates indicating the tile position are given in the parentheses. When tile positions are determined as shown in FIG. 2A, formulas of transformation from an image position (img x,img y) [pixel] into a tile position (tile_x, tile_y) are represented by tile_$x$=int(img_$x$/32)

tile_$y$=int(img_$y$/32)

In this embodiment, segmentation into tiles and addition of identification information to each tile are performed in accordance with FIG. 2A. However, the present invention is not limited to FIG. 2A. That is, generated tile images can also be identified by serial numbers. In this case, as shown in FIG. 2B, a formula of transformation from an image position (img x,img y) [pixel] into a tile number tile num is represented by tile_$num.$=int(img_$x$/32+int(img_/32*220))

Also, in tile image generation, the shape and the number of pixels of tile images can be determined in accordance with the read resolution and the convenience of image processing, so that the system controller 101 can readily process these tile images.

The formats of packets used in image data processing in the composite machine controller 100 of this embodiment will be explained below.

The image processor 110 of this embodiment transfers image data in a packet form. Another characteristic feature of this image processor 110 is to process image data for each subarea (tile). Since image data is processed for each tile, image processing can be performed with a small memory capacity.

First, the format of a tile data packet shown in FIG. 3 will be explained.

This tile data packet is made up of image data 302, a header 301, and additional image information 316. The image data 302 is obtained as each of tiles segmented by a predetermined number of pixels (in this embodiment, 32×32 pixels). The header 301 stores control information to be described later. In this embodiment, one tile data packet stores image data of one unit tile.

Figure 4:
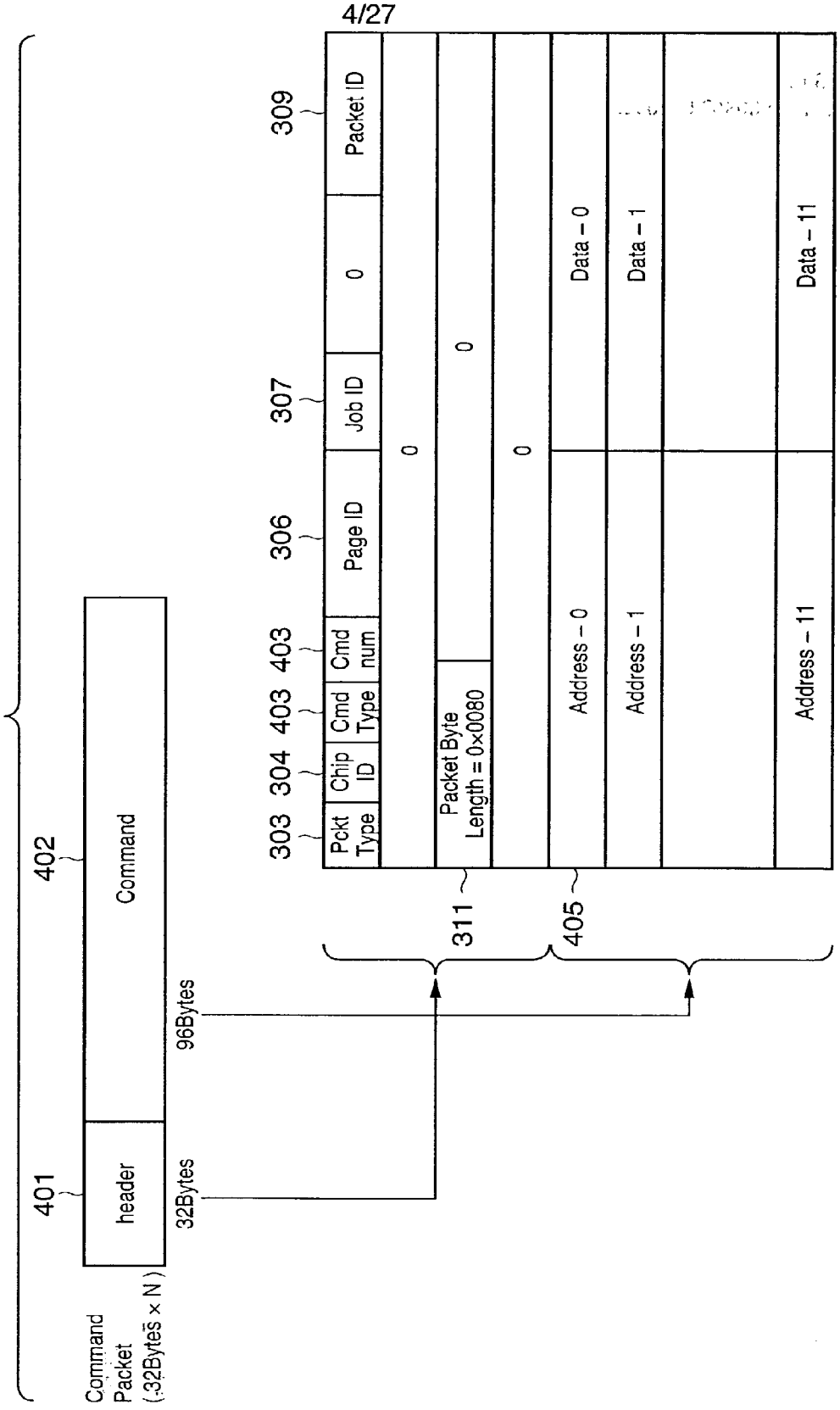

Next, the format of a command packet shown in FIG. 4 will be explained.

This command packet is made up of a header 401 and a command 402, and is used to access a register for controlling the operation of, e.g., the image data processor 121, 122, 123, or 124. The command 402 is constructed of a pair of an address 405 of a register to be accessed, and data 404.

Figure 5:
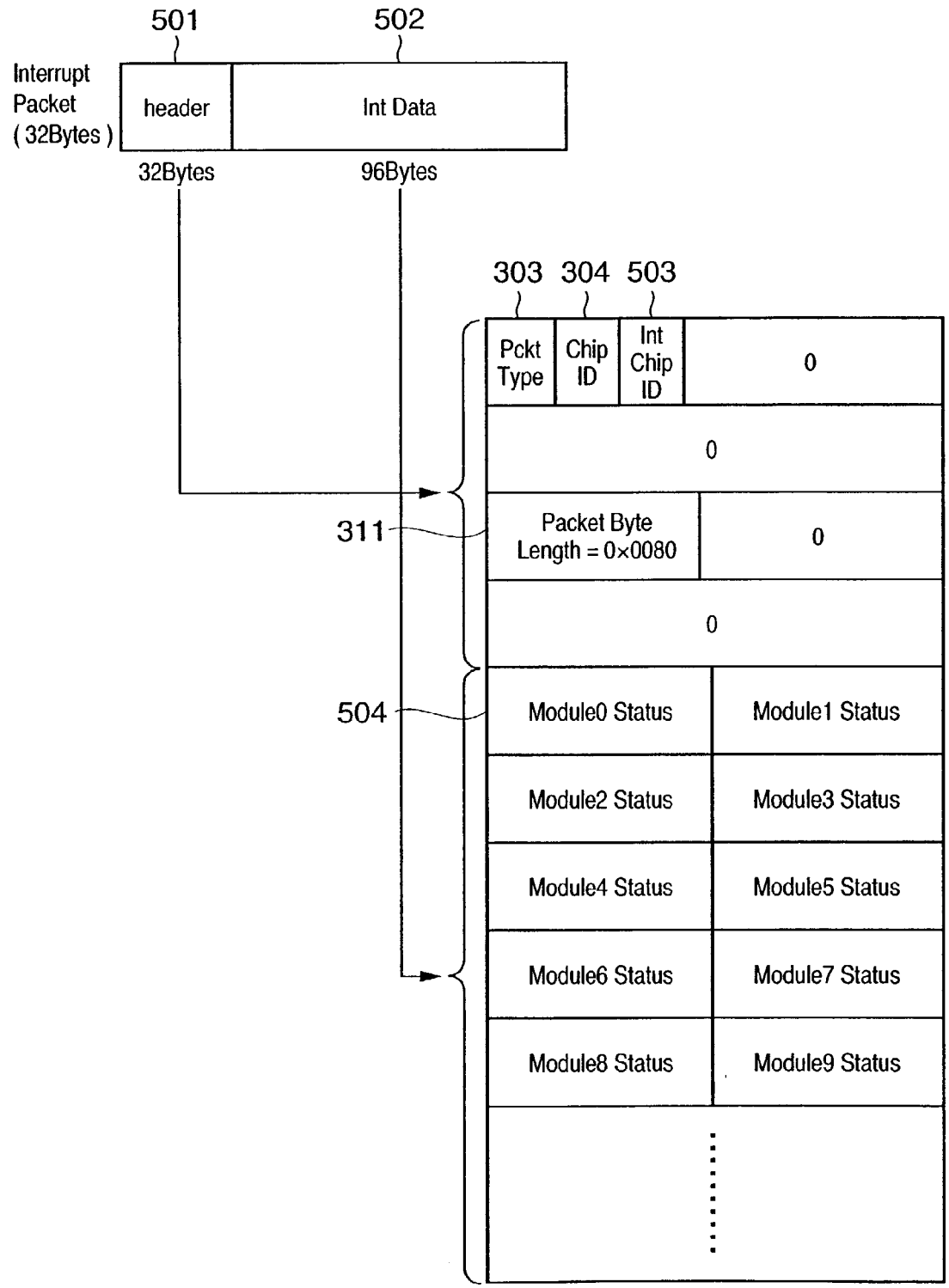
FIG. 5 is a view showing the format of an interrupt packet.

The format of an interrupt packet shown in FIG. 5 will be explained below.

This interrupt packet is made up of a header 501 and interrupt data 502, and is used to notify an interrupt from the image processor 110 to the system controller 101. The interrupt packet is issued when an abnormality occurs during processing or when the scanner completes a scan operation.

Information contained in the headers 301, 401, and 501 of these data packets will be explained (not all the following applies to all the headers).

A packet type (Type) is discriminated by a packet type (Pckt Type) 303 in the header 301, 401, or 501. In this embodiment, the values of this packet type 303 correspond to packet types as follows.

| Packet type | Type |
| --- | --- |
| 0001 | Tile data packet |
| 0001 | Command packet |
| 0010 | Interrupt packet |

A chip ID 304 indicates the transmission destination (the ID of a target chip) of the packet.

In this embodiment, the values of the chip ID 304 correspond to transmission destinations as follows.

| Chip ID | Transmission destination |
| --- | --- |
| 0000 | System controller 101 |
| 0001 | Image processor 110 |

An image type 305 stores a value indicating the data type, e.g., 1-bit black & white, 8-bit color RGB, or 8-bit color CMYK, of image data contained in the packet.

A page ID 306 indicates the number of pages (page number) of image data. A job ID 307 stores a job IDD for managing image processing by software.

A packet IDY 308 and a packet IDX 309 indicate the position of a tile, which corresponds to image data contained in (or designated by) the packet, in a whole image. The tile position is represented by YnXn by combining the Y direction (packet IDY 308) and the X direction (packet IDX 309).

A process instruction 310 is made up of processing units 1 to 8 each of which is a pair of a 5-bit unit ID 314 and a 3-bit mode 315. The entire process instruction is shifted eight bits to the left so that a processed unit ID and mode are discarded and a unit ID and mode to be processed next are positioned at the left end. This process instruction 310 stores a maximum of eight pairs of the unit ID 314 and the mode 315. As will be described below, the unit ID 314 designates each unit in the image processor 110, and the mode 315 designates the operation mode of each unit. Accordingly, continuous processing can be designated through a maximum of eight blocks for image data contained in (or designated by) one image data packet.

In this embodiment, unit IDs are related to processing units as follows.

| unit ID | Corresponding processing unit |
| --- | --- |
| 00101 | Printer interface 119 |
| 00110 | Scanner interface 120 |
| 01000 | Image combiner 121 |
| 01001 | Resolution converter 122 |
| 01010 | Color space converter 123 |
| 01100 | Image rotator 124 |

A packet byte length 311 indicates the total number of bytes in the packet.

An image data byte length 312 indicates the number of bytes of image data contained in the packet. A compress flag 313 indicates whether image data is compressed. Each of an image data offset 317 and a Z data offset 318 indicates the offset of corresponding data from the leading position of the packet. A Z data byte length 319 represents the number of bytes of additional image information. A thumbnail 320 is thumbnail information of an image.

A cmd type 403 indicates the type of a command in the command packet. A cmd num 404 indicates the number of commands in the command packet. An address 405 and data 406 are the address and data, respectively, of a register to be accessed via the register setting bus.

An int chip ID 503 indicates the transmission source of an interrupt packet. A module 0 status–module 8 status 504 contained in int data 502 is the status of each module as an interrupt generating source in the transmission source. In this embodiment, the values of the int chip ID 503 correspond to generating sources as follows.

| Int chip ID | Transmission source |
| --- | --- |
| 0000 | System controller 110 |
| 0001 | Image processor 110 |

Accordingly, in the image processor 110, for example, the image combiner 121 and the image data processors 2 to 4 (122 to 124) are modules. When an interrupt is generated from a certain module, the image processor 110 extracts the status of each module, and forms an interrupt packet stored in the corresponding module status 504. In this case, the int chip ID of the interrupt packet is "0001", which indicates the image processor 110, and the chip ID 304 as the transmission destination is "0000", which indicates the system controller 101.

The operation of an image combining process performed by the composite machine controller by using packet data following the above-mentioned formats will be explained below.

Figure 6:
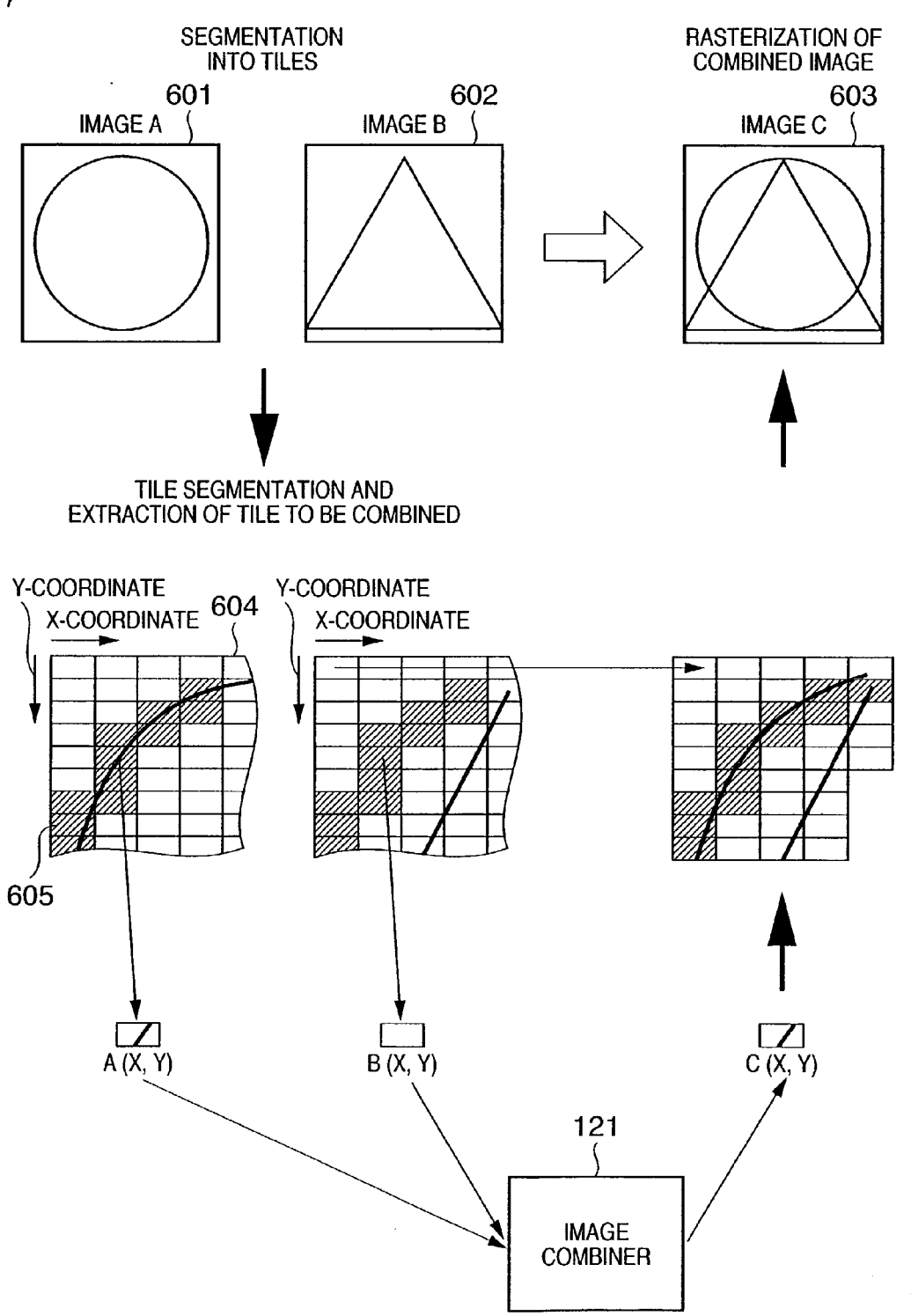
FIG. 6 is a view showing the flow of image combination according to the first embodiment.

FIG. 6 shows the flow of the image combining process according to this embodiment. In this embodiment, the composite machine controller 100 combines a one-page image A 601 and a one-page image B 602 stored in the RAM 102 to generate an image C 603 by using the image combiner 121, and stores this image C 603 in the RAM 102. For better understanding of the explanation, assume that the image A 601 and the image B 602 are binary black-and-white images in this embodiment.

Figure 7A:
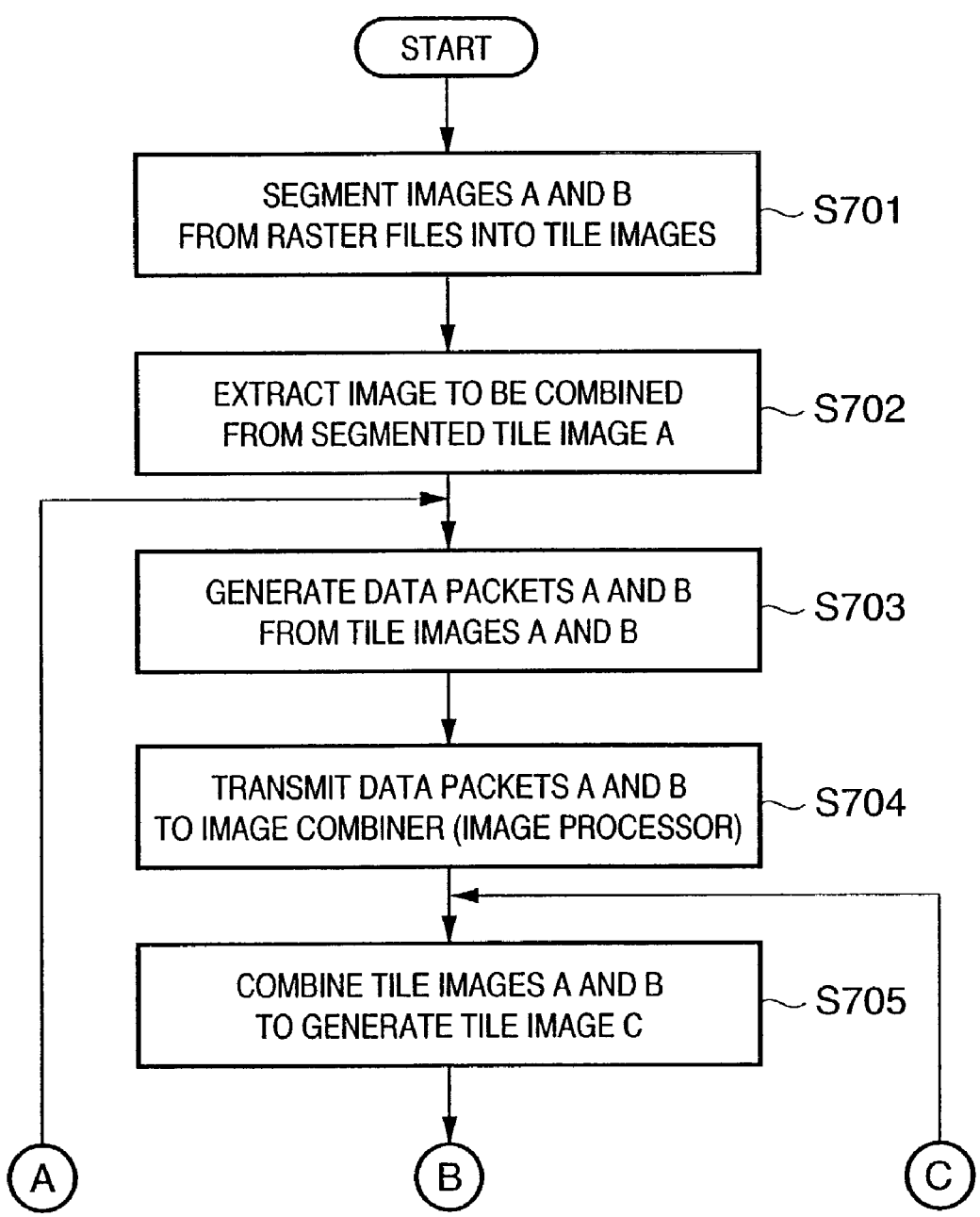
FIGS. 7A and 7B are flow charts for explaining the operation of a composite machine controller according to the first embodiment.
Figure 7B:
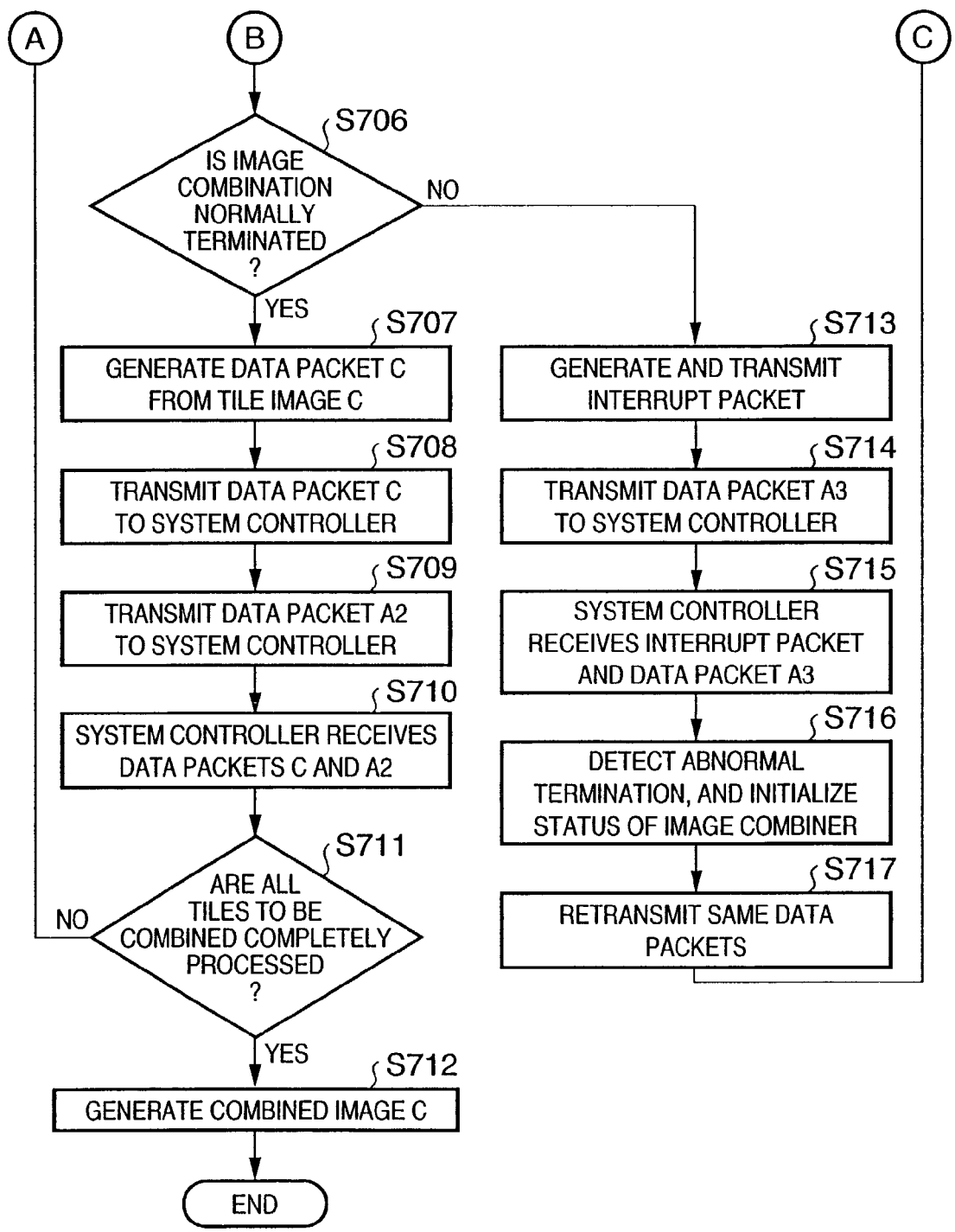

FIGS. 7A and 7B are a flow chart for explaining the operation of the composite machine controller 100 in the image combining process. A procedure of generating the combined image C from the images A and B will be explained below with reference to FIGS. 1, 6, and 7. The following operation can be implemented by the CPU of the system controller 101 by executing the programs stored in the RAM 102 or the ROM 103 and controlling the individual units. As described previously, the image processor 110 is controlled by using the various packets.

First, the system controller 101 reads out the image A 601 and the image B 602 stored beforehand in the RAM 102 and, as shown in FIGS. 2A and 2B, segments the raster files into tile images (S701).

From tiles of the segmented image A 601, the system controller 101 extracts a tile image containing an image to be combined (S702). This tile extraction is done by comparing the background color of the image with pixels contained in each tile. If pixels different from the background color are contained in a tile, this tile is regarded as having the image to be combined. An image 604 shown in FIG. 6 indicates the upper left corner of the image A 601 in an enlarged scale. Since white is the background color in this embodiment, tile images 605 containing black pixels are extracted as tiles to be combined. As shown in FIG. 2A, tiles are identified as they are numbered by combinations of the X-coordinates and the Y-coordinates.

The system controller 101 reads out a tile B (X, Y) of the image B 602, which corresponds to a tile A (X, Y) contained in the extracted tile images 605, and generates date packets from the tile A (X, Y) and the tile B (X, Y) (S703). A data packet containing the tile A (X, Y) will be referred to as a data packet A hereinafter, and a data packet containing the tile B (X, Y) will be referred to as a data packet B hereinafter. In the header 301 to be added to these data packets A and B, the unit IDs and the chip ID 304 in the process instruction 310 are unit ID 1="01000" (image combiner), unit IDs 2 to 8="00000", and chip ID="0001" (image processor). In addition, a mode for performing image combination is set in the mode 315 of this process instruction 310. Also, the Y and X components of the tile position (X, Y) are set in the packet IDY 308 and the packet IDX 309, respectively.

The system controller 101 transmits the generated data packets A and B to the image combiner 121 (image processor 110) via the image ring 106 (S704). The image data input interface 111 of the image processor 110 receives these data packets A and B and analyzes the process instruction 310 in each header. Since the unit ID 1 to be processed first indicates the image processor 121, the image data input interface 111 transfers the data packets A and B to the image combiner 121.

The image combiner 121 receives the data packets A and B transferred via the tile bus 126 and reads out the process instruction 310 of each packet. The image combiner 121 checks whether the unit ID 314 of each header matches the ID representing the image combiner 121. Since these IDs are equal as described above, the image combiner 121 checks whether the tile positions (X, Y) are equal, by checking the packet IDY 308 for the Y direction and the packet IDX 309 for the X direction. Consequently, the tile positions are found to be equal. Next, in accordance with the setting in the mode 315, the image combiner 121 combines the tile A (X, Y) and the tile B (X, Y) contained in these data packets (S705). That is, the image combiner 121 performs OR processing for each pixel contained in the tiles A (X, Y) and B (X, Y), extracted from the packets, thereby generating a combined image tile C (X, Y).

The image combiner 121 then checks whether the image combination in step S705 is normally terminated (S706). If this image combination is normally terminated (Yes in S706), the flow advances to processing in step S707. If the image combination is abnormally terminated (No in S706), the flow advances to processing in step S713 to be described later.

If the combination of the tiles A (X, Y) and B (X, Y) is normally terminated (Yes in S706), the image combiner 121 adds header information of the tile B (X, Y) to the combination result (X, Y), thereby generating a data packet C (S707). The process instruction 310 of the generated packet is shifted eight bits to set unit IDs 1 to 8="00000", and the chip ID 304 is converted into "0000" which represents the system controller 101.

The image combiner 121 transmits the generated data packet C to the system controller 101 (S708). This data packet C is transmitted to the system controller 101 via the tile bus 126, the image data output interface 112, and the image ring 107.

Also, the image combiner 121 extracts only header information of the data packet A, converts the chip ID 304 into the ID representing the system controller 101, and transmits a data packet A2 containing only this header information to the system controller 101 (S709).

The system controller 101 receives the two packets, i.e., the data packet C containing the combination result C (X, Y) and the data packet A2 (S710). The system controller 101 determines that the tiles A (X, Y) and B (X, Y) are normally transmitted and normally combined by the image combiner 121, and checks whether all tiles to be combined are completely combined (S711). If it is determined that this combining process is not completed (No in S711), the flow returns to step S703, and the system controller 121 adds header information to tiles A (X', Y') and B (X', Y') to be combined next, and transmits these tiles in a packet form to the image combiner 121 in step S704. After that, the same processing as described above is repeated.

On the other hand, if determining that the combination of the tiles A (X, Y) and B (X, Y) is abnormally terminated (No in S706), the image combiner 121 notifies the status processor 116 of this information, and the status processor 116 generates an interrupt packet and transmits this interrupt packet to, the system controller 101 (S713). Also, the image combiner 121 extracts only header information of the tile A (X, Y), converts the chip ID 304 into the ID of the system controller 101, and transmits a data packet A3 containing only this header information to the system controller 101 (S714).

The system controller 101 receives the two packets, i.e., the interrupt packet and the packet containing only the header information of the tile A (X, Y) (S715). The system controller 101 determines that the combination of the tiles A (X, Y) and B (X, Y) is abnormally terminated, and initializes the status of the image combiner 121 (S716). This status initialization is done by using a command packet. More specifically, the system controller 101 generates a command packet describing a command which indicates that the status of the image combiner 121 is to be initialized, and transmits this generated command packet to the image processor 110. The command processor 115 of this image processor 110 interprets the received command packet, and sets the internal register of the image combiner 121 to perform status initialization, via the register setting bus 128.

After the status is initialized, the tiles A (X, Y) and B (X, Y) are again transmitted to the image combiner 121 (S717). The flow returns to step S705 again, and the image combination is performed for the tiles that are not normally processed.

After image combination is repeatedly performed for individual tiles and all tiles to be combined are completely combined (Yes in S711), the system controller 101 rasterizes a raster file from the combination result received from the image combiner 121 and from tiles of the image B not used in the combination, thereby obtaining a combined image C of the images A and B (S712) and terminating the series of processes.

In this embodiment as described above, the present invention is explained by taking the case in which the controller of the composite machine combines the images A and B shown in FIG. 6 to generate the image C. First, the system controller segments the images A and B stored in the RAM into tile images, and extracts a tile image to be combined from the obtained tile images of thee image A. The system controller adds a header containing the contents of image processing and coordinate information to the extracted tile image to generate the data packets A and B, and outputs these data packets A and B to the image processor. The image combiner of this image processor receives the data packets A and B, combines the tile images in accordance with-the image processing information in the header, generates the data packet C from the tile image C after the image combination, and outputs this data packet C. On the basis of the tile image C of the data packet C output from the image combiner, the system controller generates the image C as the result of combination of the images A and B.

Since only tile images which need to be combined can be combined, the processing time of image combination can be shortened. In addition, the processing is performed for each tile image, so the hardware resources such as the memories in the image combiner and the like can be reduced. Also, a tile image is output in the form of a data packet together with image processing information, it is possible to reduce the load on the system controller which performs control and management for image combination.

In this embodiment, the image combiner checks whether tile images are normally combined. If determining that the image combination is not normally performed, the image combiner notifies the system controller of this information. In response to this information notified via the status processor, the system controller again outputs the data packet that is not normally combined.

Accordingly, each tile image can be reliably combined. This can avoid disabling of the image combining process and deterioration of the combined image.

Second Embodiment

Figure 8:
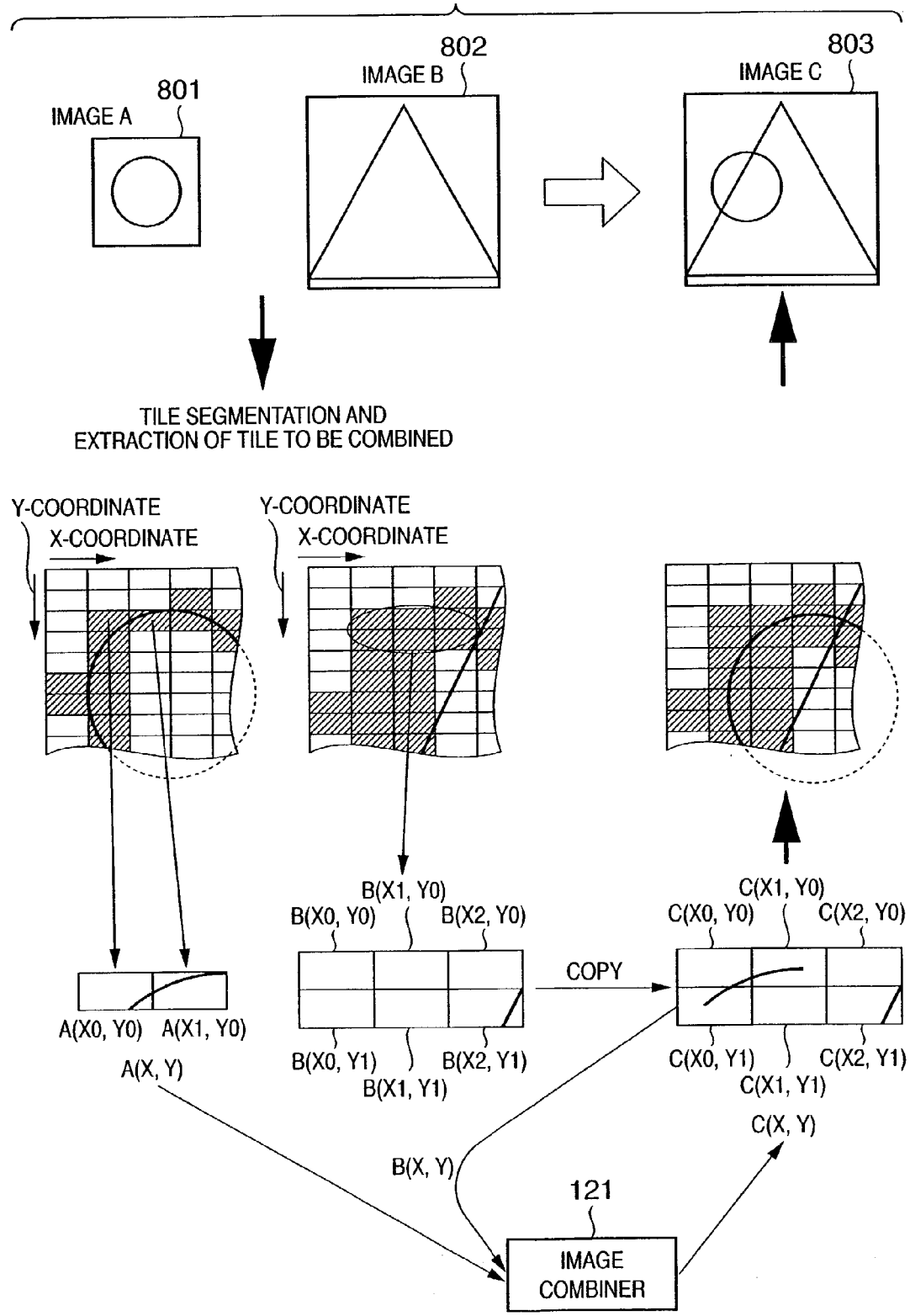
FIG. 8 is a view showing the flow of image combination according to the second embodiment.

In this embodiment, as shown in FIG. 8, combination of two images having different sizes will be explained. A hardware configuration used in the combining process of this embodiment is the same as the composite machine controller shown in FIG. 1 explained in the first embodiment.

FIG. 8 shows the flow of the image combining process according to this embodiment. In this embodiment, a composite machine controller 100 combines a one-page image A 801 and a one-page image B 802 stored in a RAM 102 to generate an image C 803 by using an image combiner 121, and stores this image C 803 in the RAM 102. As in the first embodiment, the image A 801 and the image B 802 are binary black-and-white images.

Unlike in the first embodiment, however, the image A 801 is smaller than the image B 802, and the combined image C 803 has the same size as the image B 802.

As described previously, the tile position of each image tile is determined every 32 pixels in the X and Y directions. On the other hand, the combination position of the images A and B as raster image data can be designated pixel by pixel on the basis of the coordinate system of a page image. This combination position is designated by an operator by inputting desired position coordinates by using, e.g., a touch panel or digitizer.

When the combination position can be freely designated as described above, an error may be produced every pixel between a tile position concerning the image A and a tile position concerning the image B when an image combining process is executed. In some cases, no one-to-one correspondence can be obtained between tiles of these images A and B.

In this embodiment, the composite machine controller 100 performs a tile image selecting process in advance in accordance with the rules of combination positions presented below, and then executes an image combining process.

FIGS. 9 to 13 are views for explaining the relationship between the image B and the position to which a tile A (X, Y) is to be combined.

Figure 9:
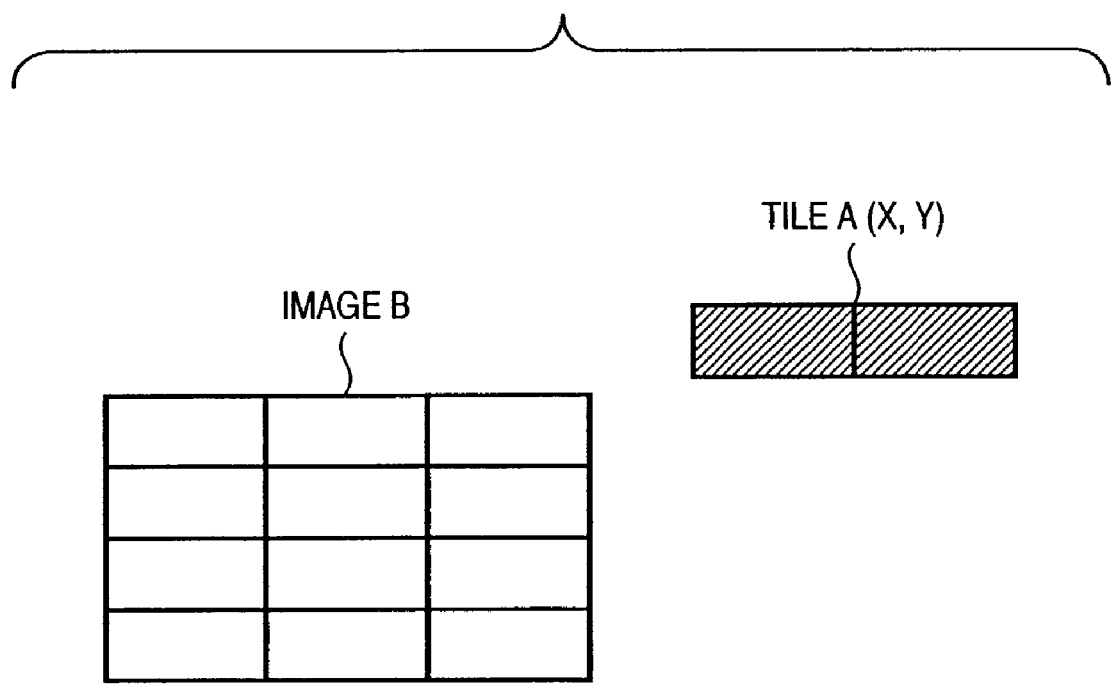
FIGS. 9 to 12 are views for explaining the relationship between an image B and a position to which a tile A is to be combined.
Figure 10:
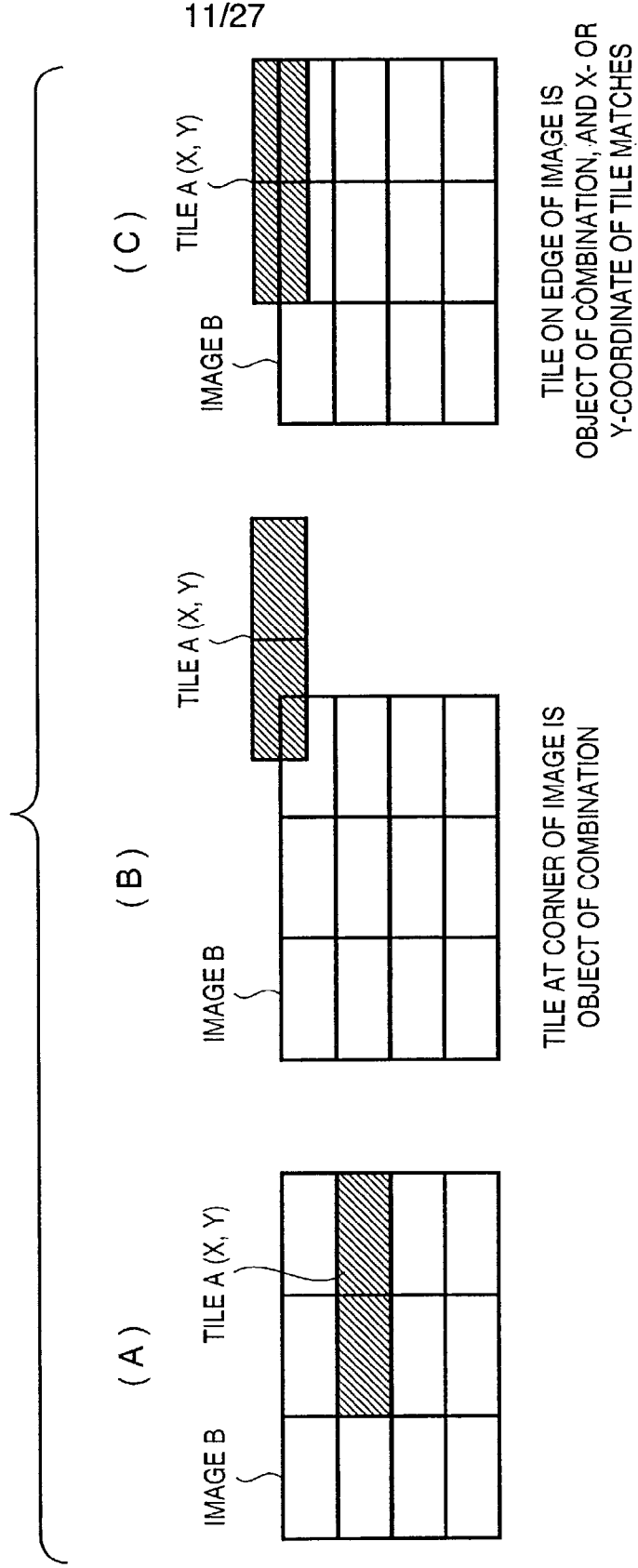
Figure 11:
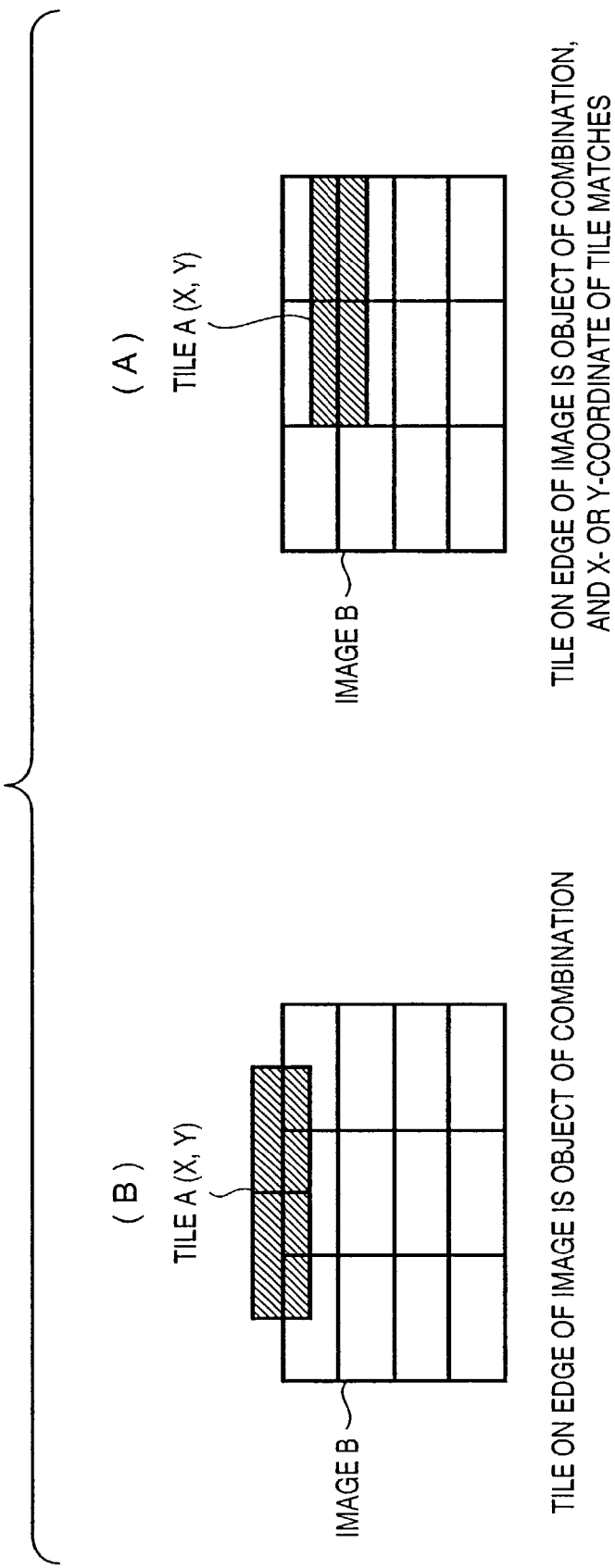

As shown in FIG. 9, if the tile A (X, Y) is outside the region of the image B, tile image combination is unnecessary because there is no tile B (X, Y).

As shown in FIG. 10A, if the coordinate positions of the tile A (X, Y) and the tile B (X, Y) perfectly match (overlap), one tile B (X, Y) corresponds to the tile A (X, Y). As shown in FIGS. 10B and 10C, the tile A (X, Y) sometimes partially overlaps the edge of the image B. Even in cases like these, one tile B (X, Y) corresponds to the tile A (X, Y).

As shown in FIG. 11A, if the X- or Y-coordinates of the tile A (X, Y) and the tile B (X, Y) overlap, two tiles B (X, Y) correspond to the tile A (X, Y). As shown in FIG. 11B, if the coordinates of the tile A (X, Y) do not match the coordinates of the tile B (X, Y) and the tile A (X, Y) is present on the edge of the image B, two tiles B (X, Y) correspond to the tile A (X, Y).

Figure 12:
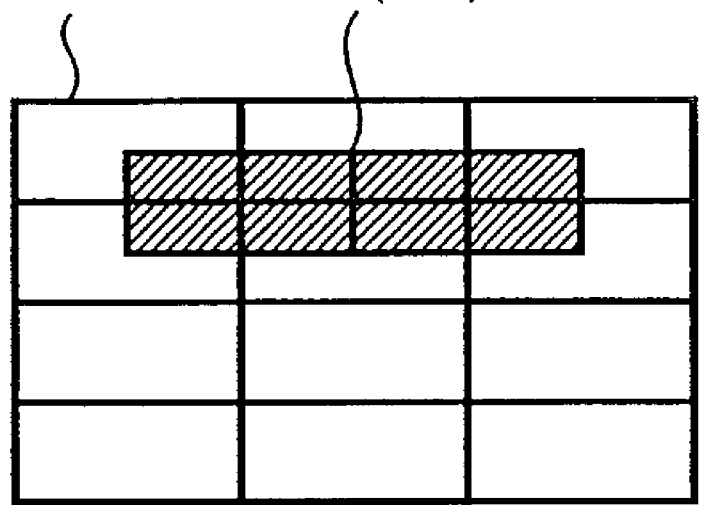

As shown in FIG. 12, if the tile A (X, Y) is in the range of the image B and the coordinate positions of the tile A (X, Y) and the tile B (X, Y) do not overlap at all, four tiles B (X, Y) correspond to the tile A (X, Y).

In the following description, combination of the tile A (X, Y) and the four tiles B (X, Y) as shown in FIG. 12 will be explained. Note that even if the number of tiles B (X, Y) changes, the method of combination remains the same, so the essence of the present invention is not lost.

Figure 13A:
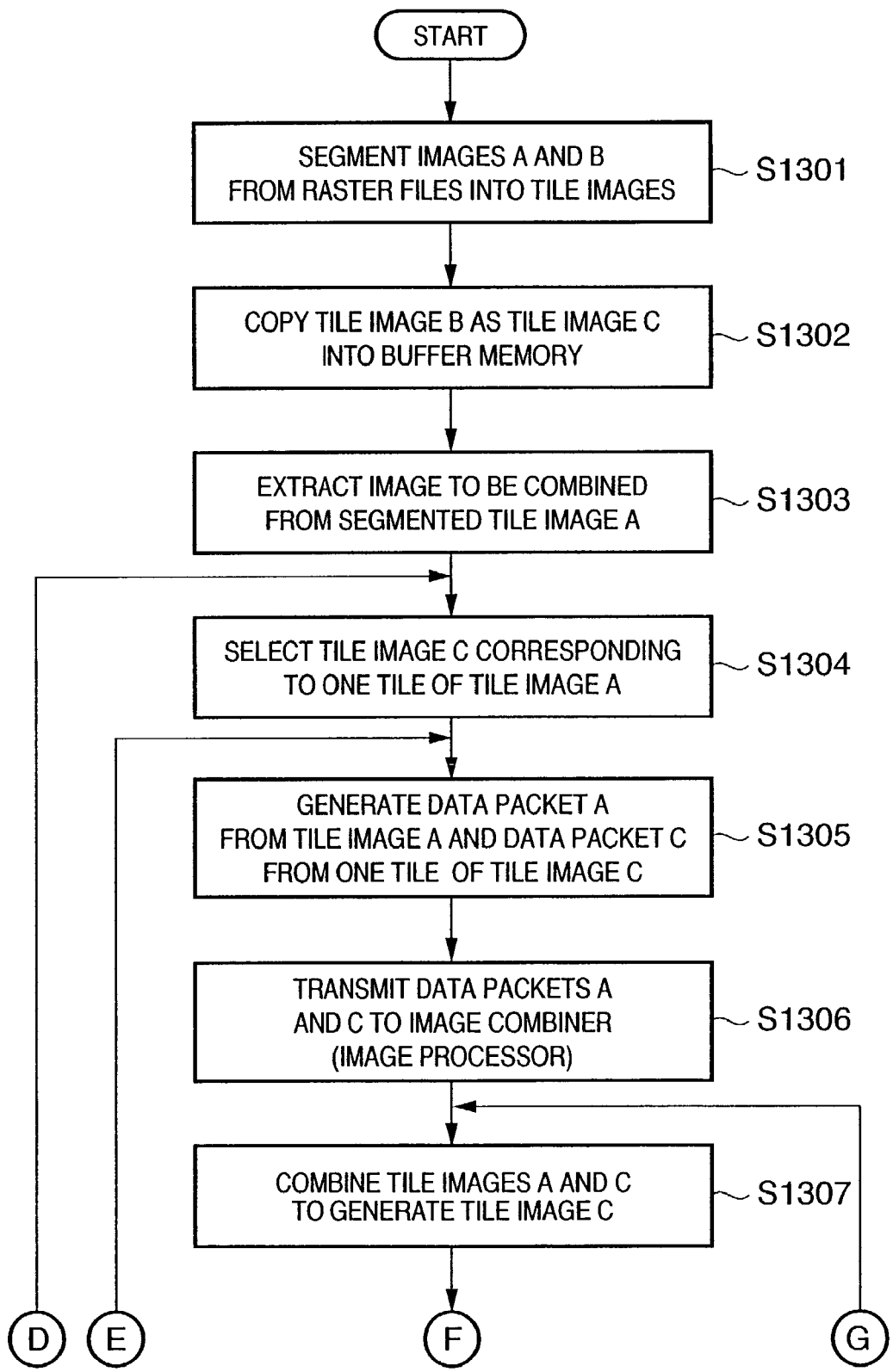
FIGS. 13A and 13B are flow charts for explaining the operation of a composite machine controller in image combination according to the second embodiment.
Figure 13B:
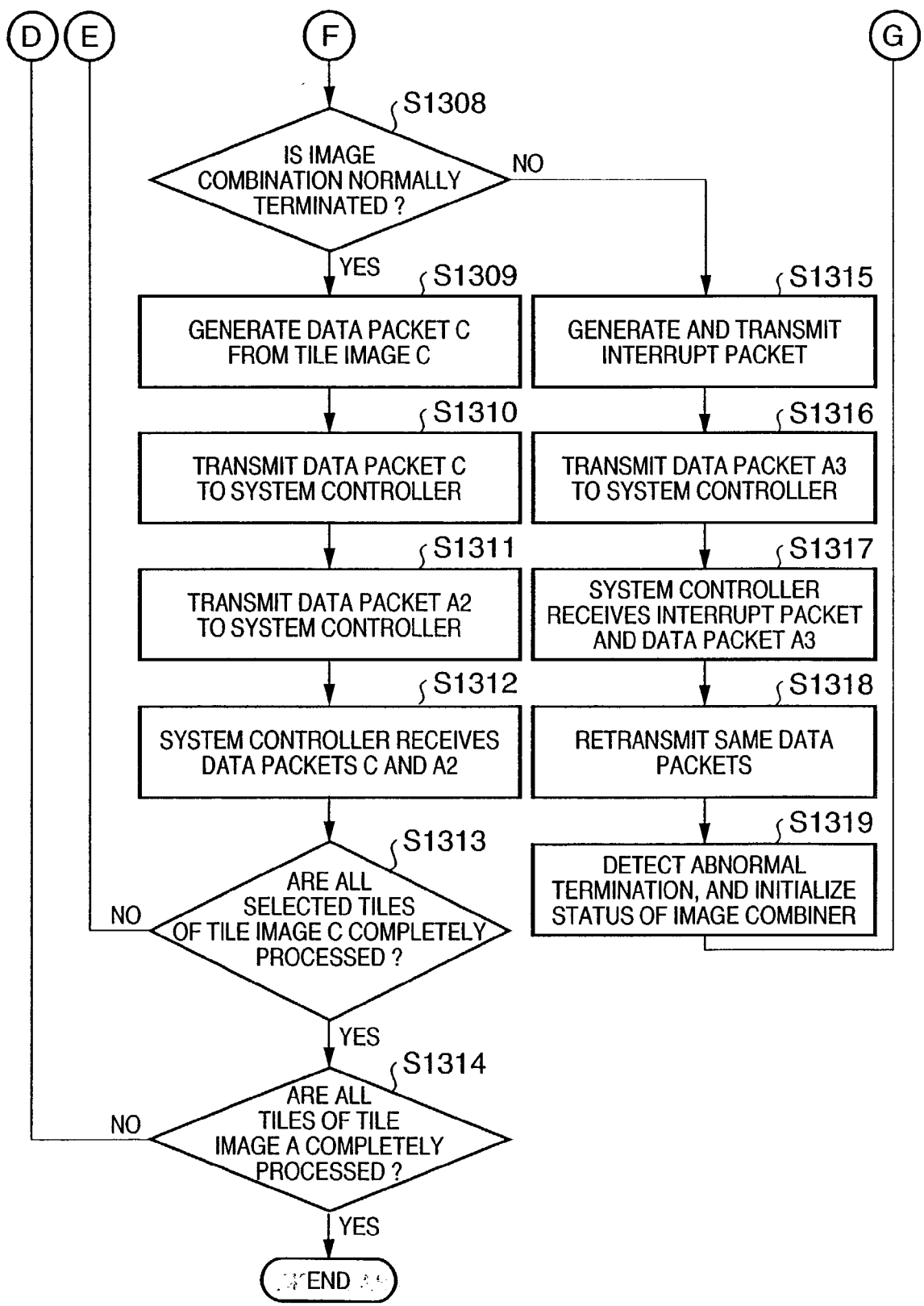

FIGS. 13A and 13B are flow charts for explaining the operation of the composite machine controller 100 in the image combining process of this embodiment. A procedure of generating the combined image C from the images A and B will be explained with reference to FIGS. 1, 8, and 13. The following operation may be implemented by an internal CPU of a system controller 101 by executing programs stored in the RAM 102 or a ROM 103 and controlling individual units. As described earlier, an image processor 110 is controlled by using various packets.

First, the system controller 101 reads out the image A 801 and the image B 802 stored in the RAM 102 and, as shown in FIGS. 2A and 2B, segments the raster files into tile images (S1301).

The system controller 101 then copies all segmented tiles B (X, Y), as tiles C (X, Y) which are tile images of the combined image C, into the RAM 102 (S1302).

The system controller 101 extracts a tile image containing an image to be combined, from the tiles of the segmented image A 801. As in the first embodiment, this tile extraction is done by comparing the background color of the image with pixels contained in each tile.

As shown in FIG. 8, from the one-page tile image C stored in the RAM 102, a plurality of tile images C corresponding to a tile A (X0, Y0) extracted from the image A are selected (S1304).

A process of combining the tile A (X0, Y0) and four selected tiles, i.e., a tile C (X0, Y0), a tile C (X1, Y0), a tile C (X0, Y1), and a tile C (X1, Y1) is executed.

Next, a data packet is generated from the tile A (X0, Y0) and the tile C (X0, Y0) (S1305). A data packet containing the tile A (X0, Y0) will be referred to as a data packet A hereinafter, and a data packet containing the tile C (X0, Y0) will be referred to as a data packet C hereinafter. In a header 301 to be added to these data packets A and C, unit IDs and a chip ID 304 in an process instruction 310 are unit ID 1="01000" (image combiner), unit IDs 2 to 8="00000", and chip ID="0001" (image processor). In addition, a mode for performing image combination is set in a mode 315 of this process instruction 310. Also, the Y and X components of the tile position (X, Y) are set in a packet IDY 308 and a packet IDX 309, respectively.

Unlike in the first embodiment, three pairs of modes and unit IDs are used in image combination. A value designating image combination is set in the first mode, the X-coordinate of the combination position is set in the second mode, and the Y-coordinate of the combination position is set in the third mode. A value indicative of the image combiner 121 is set in all the unit IDs.

The system controller 101 transmits the generated data packets A and C to the image combiner 121 (image processor 110) via an image ring 106 (S1306). An image data input interface 111 of the image processor 110 receives these data packets A and C and analyzes the process instruction 310 in each header. Since the unit ID 1 to be processed first indicates the image processor 121, the image data input interface 111 transfers the data packets A and C to the image combiner 121.

The image combiner 121 receives the data packets A and C and reads out the process instruction 310 of each packet. If the readout unit ID 314 matches the ID representing the image combiner 121, the image combiner 121 executes a process according to the readout unit ID 314, i.e., a process of combining the tile A (X0, Y0) and the tile C (X0, Y0) (S1307). The image combiner 121 extracts tile images from the received packets and combines the extracted tile images. The tile A (X0, Y0) extracted from the packet is converted into the coordinate position corresponding to the tile C (X0, Y0). The image combiner 121 outputs a tile image data tile C (X'O, Y'O) which is obtained by ORing the tile A (XO, YO) whose coordinate position is converted and the tile C (XO, YO). The coordinate system of the tile image data after the combination naturally matches the coordinate system of the combined image C.

The image combiner 121 then checks whether the image combination in step S1307 is normally terminated (S1308). If this image combination is normally terminated (Yes in S1308), the flow advances to processing in step S1309. If the image combination is abnormally terminated (No in S1308), the flow advances to processing in step S1315.

The processing from step S1315 to step S1319 is similar to the error processing shown in step S713 to step S717 of the first embodiment, so a detailed description thereof will be omitted.

If the combination of the tiles A (XO, YO) and C (XO, YO) is normally terminated (Yes in S1308), the image combiner 121 stores the tile C (X'O, Y'O) as the result of combination into the packet in which the tile C (XO, YO) is stored, thereby generating a data packet C (S1309). In this packet generation, the image combiner 121 shifts the process instruction 310 of the data packet by eight bits and sets the ID indicating the system controller 101 into the chip ID 304.

The image combiner 121 then transmits the generated data packet C to the system controller 101 (S1310). Furthermore, the image combiner 121 extracts the header information 301 from the packet of the tile A (XO, YO) and transmits to the system controller 101 a packet A2 containing only this header information in which the ID indicating the system controller 101 is set in the chip ID 304.

The system controller-101 receives the data packet C of the tile C (X'O, Y'O) as the combination result and the data packet A2 containing only the header information 301 of the tile A (X0, Y0) (S1312).

The system controller 101 determines that the packets of the tiles A (X0, Y0) and C (X0, Y0) are normally transmitted and normally combined by the image combiner 121, and checks whether all tiles C selected in relation to the tile A (XO, YO) are completely combined (S1313).

If it is determined that this combining process of the tile A (X0, Y0) is not completed (No in S1313), the flow returns to step S1305, and a packet of tile image data to be combined next is transmitted to the system controller 121.

Accordingly, the tile A (XO, YO) and a tile C (XO, Y1), the tile A (XO, YO) and a tile C (X1, YO), and the tile A (XO, YO) and a tile C (X1, Y1) are sequentially combined to obtain combined tiles C (X'O, Y'O), C (X'1, Y'O), and C (X'1, Y'1), respectively.

On the other hand, if determining that the combining process of the tile A (XO, YO) is completed (Yes in S1313), the system controller 101 checks whether all the extracted tiles A are completely combined (S1314).

If it is determined that this combining process is not completed (No in S1314), the flow returns to step S1304 to start processing for the next tile A. That is, a process of combining a tile A extracted from the image A and four tiles C (X1, Y0), C (X2, Y0), C (X1, Y1), and C (X2, Y1) selected from the combined image C is executed.

Since, however, some tiles C (X, Y) are already combined, the combination results are used as tile images. That is, referring to FIG. 8, an image combining process as described above is performed for tiles C (X'1, Y'0), C (X'1, Y'1), C (X2, Y0), and C (X2, Y1).

When all the tile images A to be combined are completely combined by continuing the above combining process (Yes in S1314), the system controller 101 rasterizes the tiles C (X, Y) into a raster image file to configure the combined image C, thereby terminating the process.

In this embodiment as described above, if one-to-one correspondence is not obtained between tiles of images A and B, tile images B corresponding to a tile image A are selected in accordance with the combination position coordinates of the image A and the original image B, thereby combining the tile image A and each tile image B.

Accordingly, even when an arbitrary combination position is designated, a combining process using a minimum necessary number of tiles can be performed. This makes it possible to execute a combining process flexibly meeting the demands of the user while maintaining the high speed of tile processing.

Third Embodiment

Figure 14:
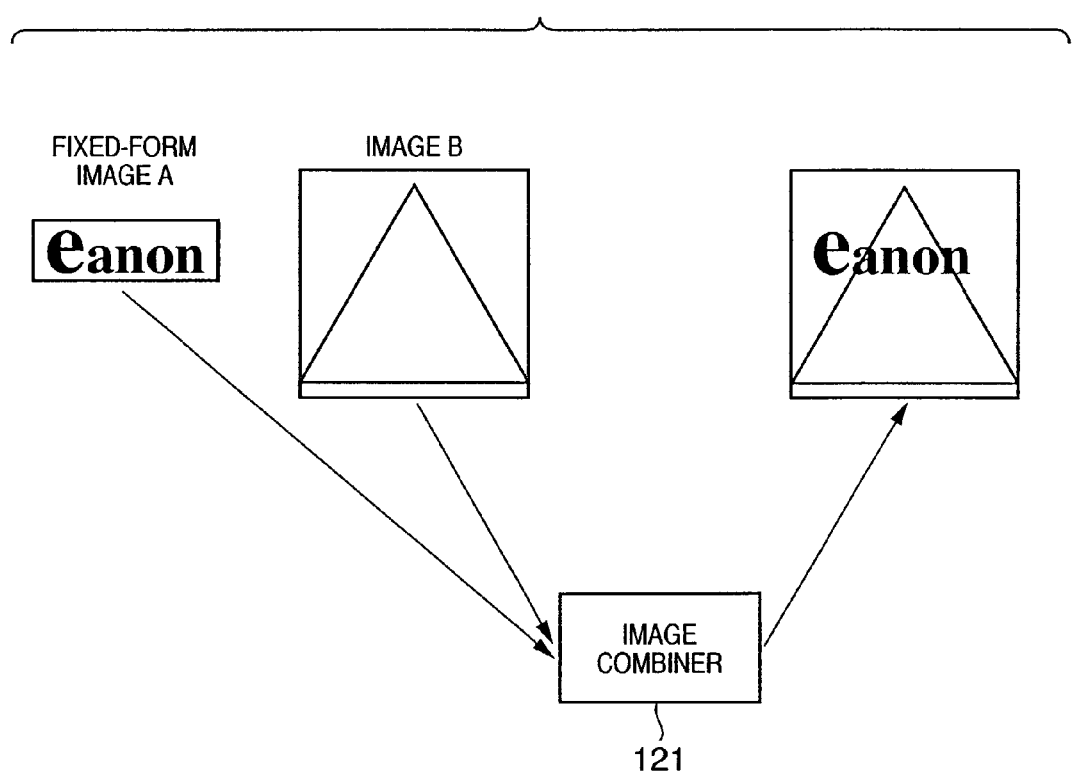
FIG. 14 is a view showing the relationship between images before and after combination according to the third embodiment.

In this embodiment, as shown in FIG. 14, combination of a fixed-form image, which is stored beforehand in order to be combined with another image, and an arbitrary image will be explained. A hardware configuration used in the combining process of this embodiment is the same as the composite machine controller shown in FIG. 1 explained in the first embodiment.

Figure 15:
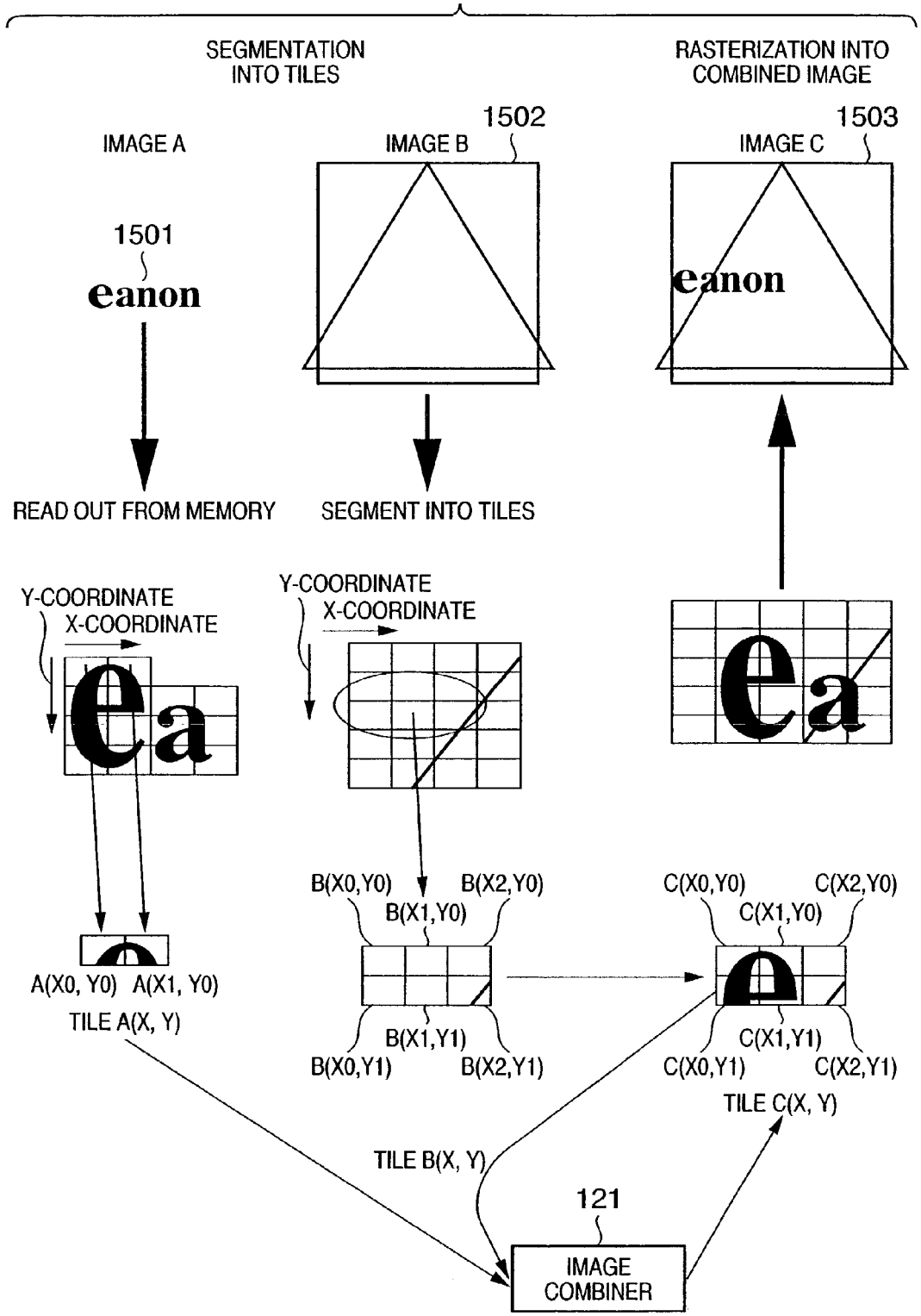
FIG. 15 is a view showing the flow of image combination according to the third embodiment.

FIG. 15 shows the flow of the image combining process according to this embodiment. In this embodiment, a composite machine controller 100 combines a one-page fixed-form image A 1501 and a one-page image B 1502 stored in a RAM 102 to generate an image C 1503 by using an image combiner 121, and stores this image C 1503 in the RAM 102. As in the first and second embodiments, the fixed-form image A 1501 and the image B 1502 are-binary black-and-white images.

Unlike in the first and second embodiments, however, the fixed-form image A 1501 is stored in an external storage 132 beforehand as an image to be combined.

Figure 16:
FIG. 16 is a view showing an example of segmentation of a fixed-form image A into tiles.

FIG. 16 shows an example of segmentation of the fixed-form image A 1501 into tiles. In this embodiment, white is the background color as in the previous embodiments, so tile images containing black pixels are tiles to be combined.

Figure 17B:
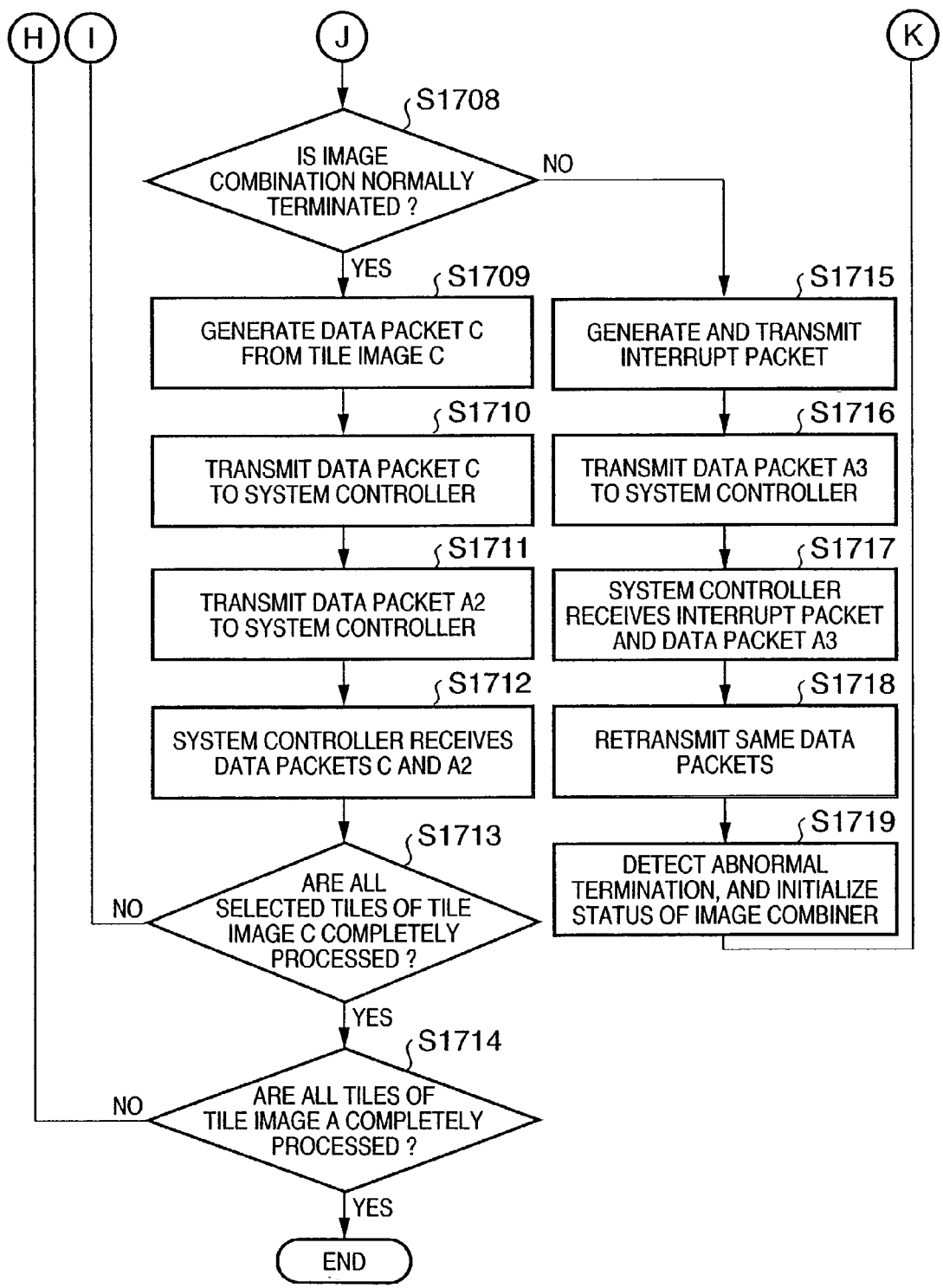

FIGS. 17A and 17B are a flow chart for explaining the operation of the composite machine controller 100 in the image combining process. A procedure of generating the combined image C from the fixed-form image A and the image B will be explained with reference to FIGS. 1, 15, and 17. The following operation can be implemented by an internal CPU of, a system controller 101 by executing programs stored in the RAM 102 or a ROM 103 and controlling individual units. As described earlier, an image processor 110 is controlled by using various packets.

First, at the start of the combining process, the system controller 101 reads out the fixed-form image A stored beforehand in the external storage 132, segments the readout fixed-form image A into tiles, and stores the segmented fixed-form image A in the RAM 102. In this processing, fixed-form image tile information containing the X- and Y-coordinates of tiles and the storage addresses of these tiles in the RAM 102 is generated (S1701).

The system controller 101 segments the arbitrary image B to be combined from a raster file into tile images (S1702).

The system controller 101 then copies all segmented tiles B (X, Y), as tiles C (X, Y) which are tile images of the combined image C, into the RAM 102 (S1703).

As shown in FIG. 15, the system controller 101 selects a plurality of tile images C corresponding to a tile A (X0, Y0), from the one-page tile image C stored in the RAM 102 (S1704).

A process of combining the tile A (X0, Y0) and four selected tiles, i.e., a tile C (X0, Y0), a tile C (X1, Y0), a tile C (X0, Y1), and a tile C (X1, Y1) is executed.

After that, the same processing as in the second embodiment is executed. That is, steps S1705 to S1719 in FIG. 17 of this embodiment correspond to steps S1305 to S1319 in FIG. 13 of the second embodiment, so the same processes are executed in steps having the corresponding step numbers.

Accordingly, when all tiles images A of the fixed-form image are completely processed (Yes in S1714), the system controller 101 rasterizes the tile C (X, Y) in to a raster image file, thereby configuring the combined image C.

In this embodiment as described above, a tile image A of a fixed-form image in the external storage is stored in the RAM, and this tile image A stored in the RAM and a tile image B corresponding to the tile image A are combined.

When a fixed-form image to be combined is predetermined, therefore, a procedure of extracting the tile image A to be combined can be omitted. This further increases the processing speed and reduces the control load on the CPU and the like. Also, only necessary tile images can be stored as a fixed-form image in the external storage and the RAM and can be used. This further reduces the memory capacity and makes a low-cost combining process feasible.

In this embodiment, a fixed-form image is stored as a raster image file in the external storage before a combining process is started. However, a fixed-form image-can also be stored as tile images together with coordinate information. When this is the case, a procedure of segmentation into tile images can also be omitted. This further increases the speed of the combining process.

Fourth Embodiment

Figure 18:
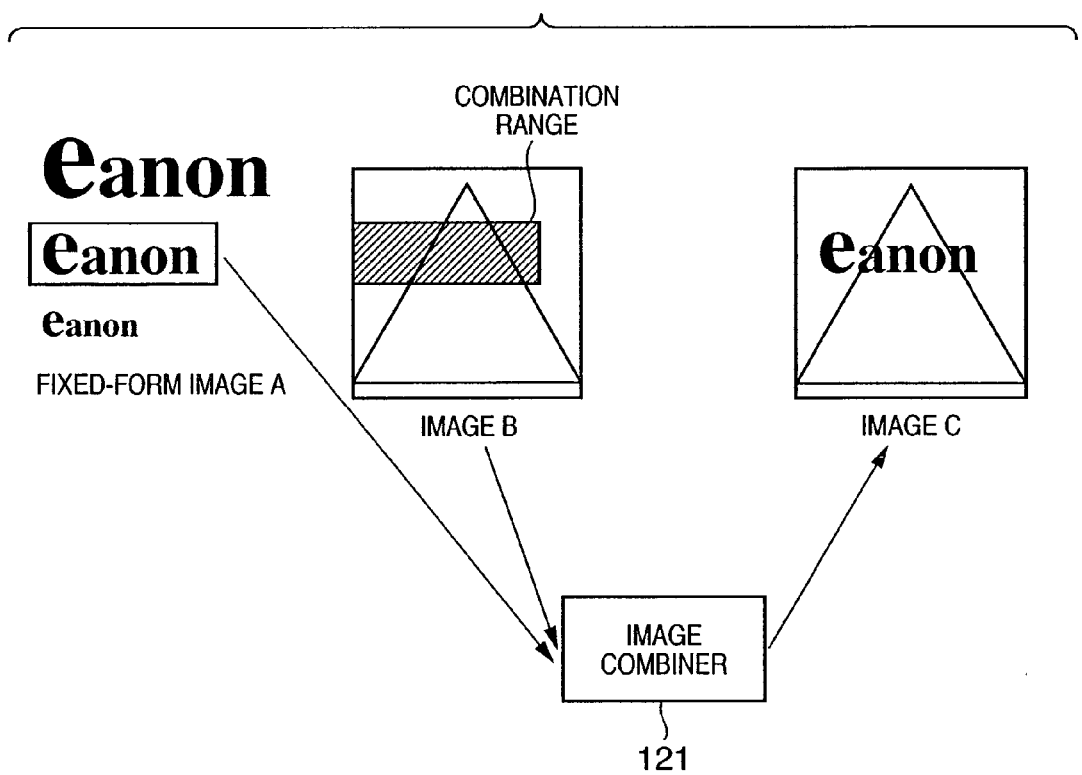
FIG. 18 is a view showing the relationship between images before and after combination according to the fourth embodiment.

In this embodiment, as shown in FIG. 18, combination of a resolution-converted, fixed-form image and an arbitrary image will be explained. A hardware configuration used in the combining process of this embodiment is the same as the composite machine controller shown in FIG. 1 explained in the first embodiment.

Figure 19:
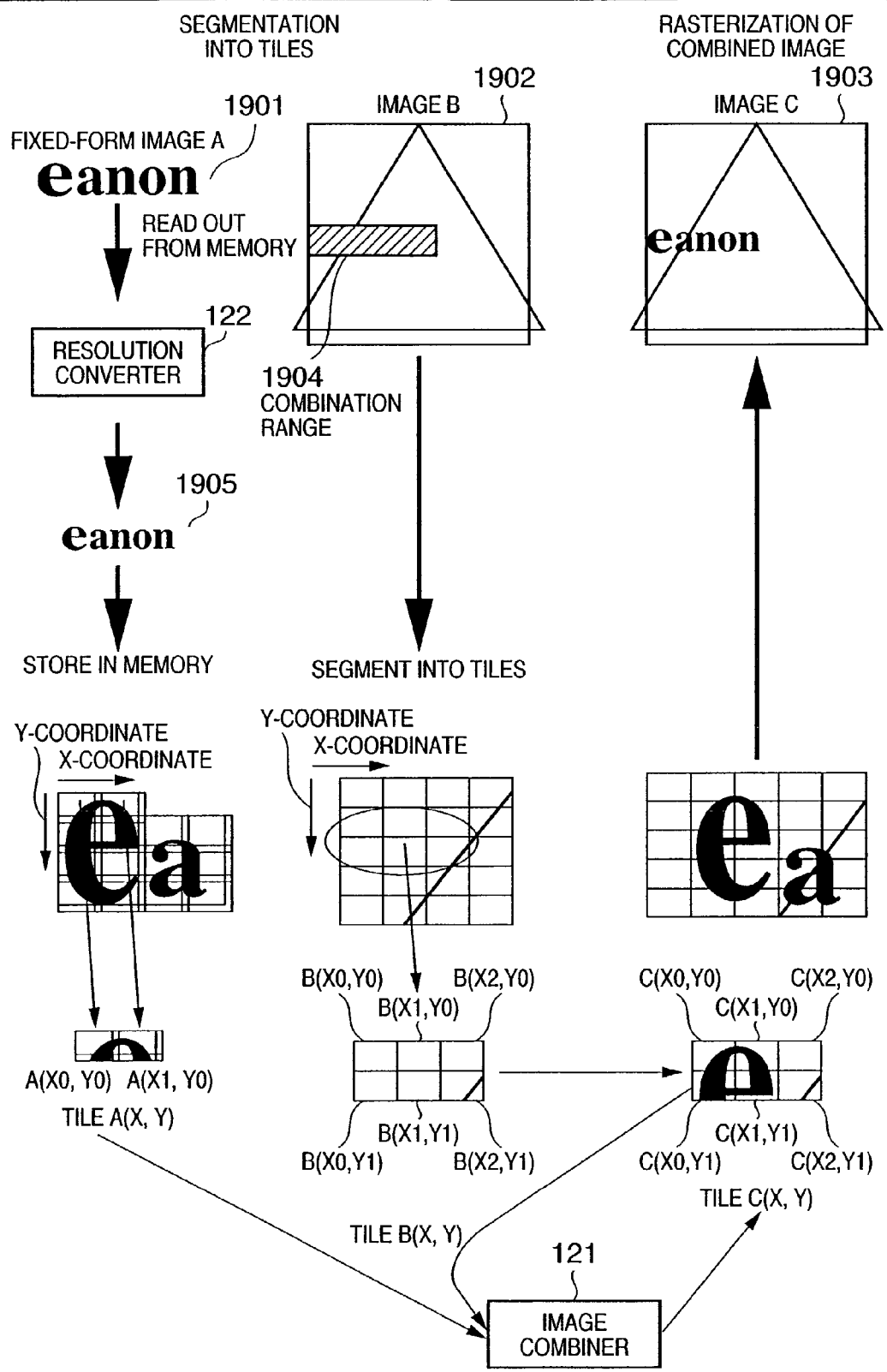
FIG. 19 is a view showing the flow of image combination according to the fourth embodiment.

FIG. 19 shows the flow of the image combining process according to this embodiment. In this embodiment, a composite machine controller 100 combines a one-page fixed-form image A 1901 and a one-page image B 1902 stored in a RAM 102 to generate an image C 1903 by using an image combiner 121, and stores this image C 1903 in the RAM 102. As in the first to third embodiments, the image A 1901 and the image B 1902 are binary black-and-white images. Also, in this embodiment, white is the background color and tile images containing black pixels are tiles to be combined, as in the previous embodiments.

Unlike in the third embodiment, however, the fixed-form image A 1901 is so combined as to match a designated combination range 1904 in the image B. Therefore, this fixed-form image A 1901 is subjected to resolution conversion which is enlargement or reduction, and a converted image 1905 is combined with the image B.

As shown FIG. 1, a resolution converter 122 is connected to a tile bus 126, and data packets can be transferred between a system controller 101 and an image combiner 121.

In this embodiment, therefore, a fixed-form image tile A is supplied from the RAM 102 to the resolution converter 122, and the resolution converter 122 converts the resolution of this fixed-form image tile A. The resolution-converted, fixed-form image tile A is once returned to the RAM 102 and then combined with the image B.

Figure 20B:
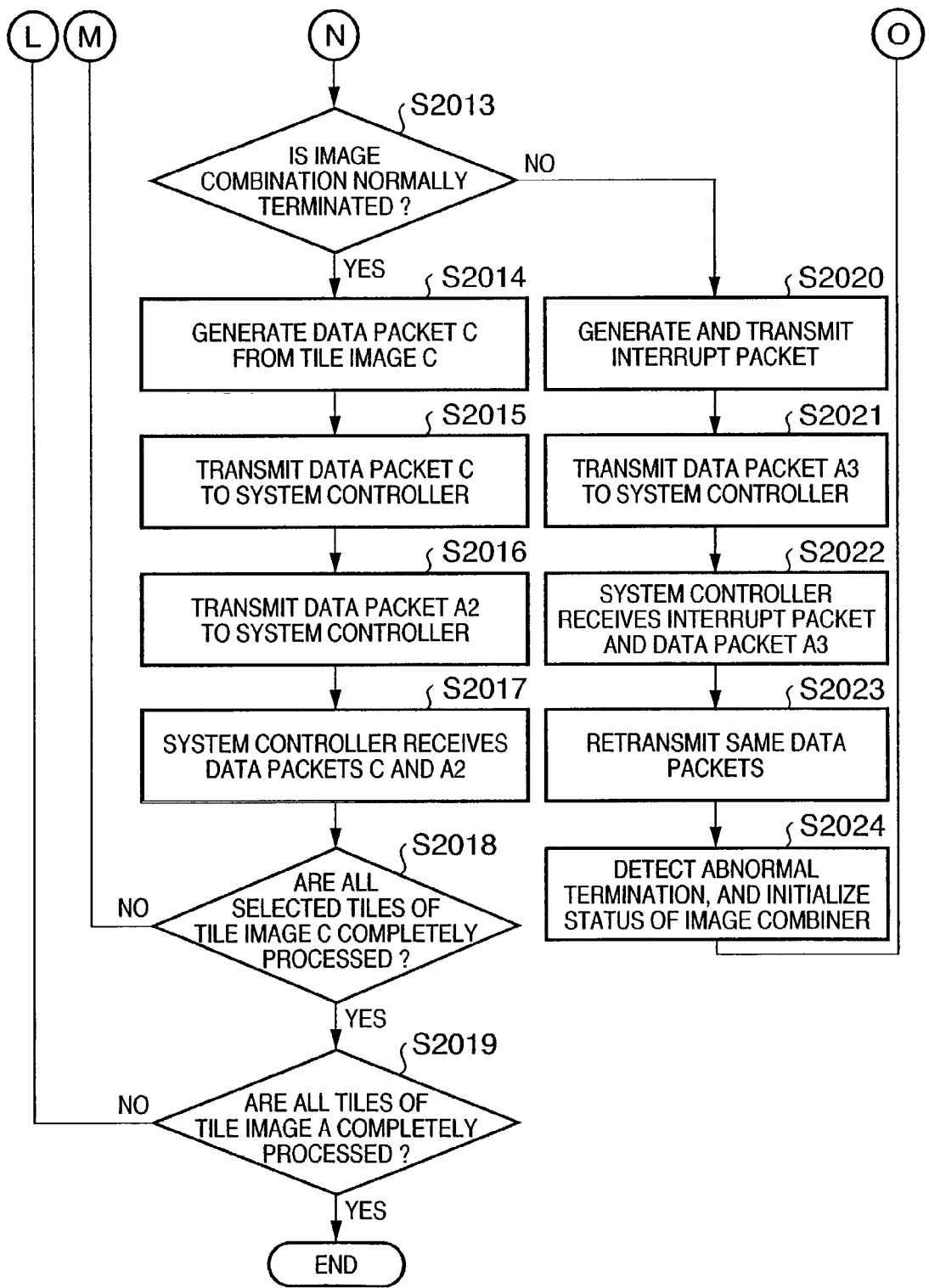

FIGS. 20A and 20B are a flow chart for explaining the operation of the composite machine controller 100 in the image combining process of this embodiment. A procedure of generating the combined image C from the fixed-form image A and the image B will be explained with reference to FIGS. 1, 19, and 20. The following operation can be implemented by an internal CPU of the system controller 101 by executing programs stored in the RAM 102 or a ROM 103 and controlling individual units. As described earlier, an image processor 110 is controlled by using various packets.

First, at the start of the combining process, the system controller 101 reads out the fixed-form image A stored beforehand in an external storage 132, segments the readout fixed-form image A into tiles, and stores the segmented fixed-form image A in the RAM 102. In this processing, fixed-form image tile information containing the X- and Y-coordinates of the tiles and the storage addresses of these tiles in the RAM 102 is generated (S2001).

Next, data packets are generated from tile images A in-the RAM 102 and transmitted to the resolution converter 122. A magnification for performing resolution conversion matching the combination range in the image B is set in the mode of a process instruction 310 of the header (S2002).

On the basis of the magnification setting information in the headers of the received data packets, the resolution converter 122 converts the resolution of the tiles (S2003).

The resolution-converted tiles are again converted into data packets and transmitted to the system controller 101 (S2004).

The tile images A of the data packets transmitted to the system controller 101 are once stored as the resolution-converted, fixed-form image A in the RAM 102 (S2005).

Subsequently, the-image B is segmented from a raster file into tile images (S2006), and tile images B are copied as tile images C into a buffer memory (S2007).

Since in step S2003 the size of each tile image A is changed by resolution conversion, the position of combination, on the image C (a copied image of the image B), of each tile image A in the RAM 102 is calculated (S2008). Details of this combination position calculation will be described later.

On the basis of the combination position calculated in step S2008, a tile image C corresponding to each tile image A is selected (S2009). After that, the same processing as in the third embodiment is executed.

That is, steps S2011 to S2019 and steps S2020 to S2024 in FIG. 20 of this embodiment correspond to steps S1705 to S1714 and steps S1715 to 1719, respectively, in FIG. 17 of the third embodiment, so the same processes are executed in steps having the corresponding step numbers.

The foregoing is the flow of the image combining process according to this embodiment. Resolution conversion according to this embodiment and combination position calculation in step S2008 will be described in detail below.

Figure 21A:
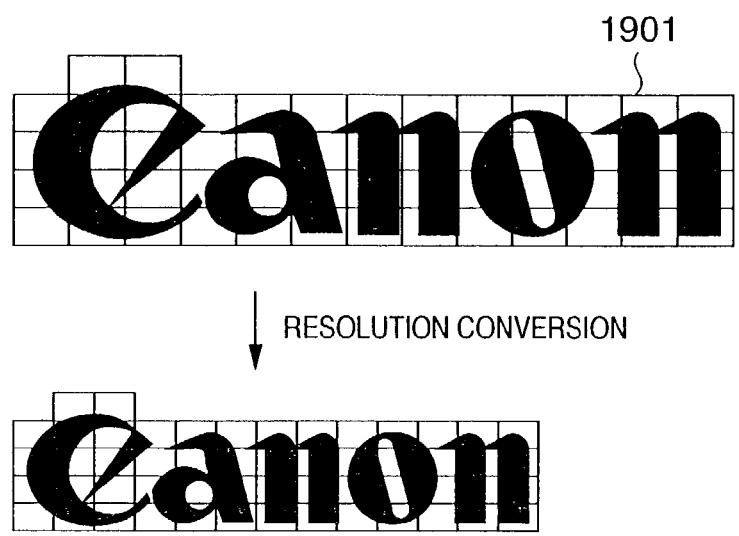
FIGS. 21A and 21B are views for explaining a case in which resolution conversion which reduces a fixed-form image A is performed.

FIG. 21A shows tiles when reduction is performed as resolution conversion for the fixed-form image A 1901 segmented into tiles. FIG. 22A shows tiles when enlargement is performed as resolution conversion for the fixed-form image A 1901 segmented into tiles.

As shown in FIGS. 21A and 22A, when resolution conversion which is reduction or enlargement is performed for the fixed-form image A, the size of a fixed-form image tile A before the resolution conversion differs from that of a fixed-form image tile A after the resolution conversion.

First, a case in which the fixed-form image A is reduced from the original size by resolution conversion will be explained below. As shown in FIG. 211B, in step S2003 a tile A 2101 contained in the fixed-form image A is converted into a tile A' 2102 by resolution conversion. An image 2103 contained in this converted tile A' 2102 is smaller than that contained in the original tile A 2101, so a portion 2104 containing no data is formed in the tile A' 2102.

In this embodiment, the system controller 101 directly uses the resolution-converted tile A' 2102 and combines only a portion containing data. That is, as shown in FIG. 211B, in step S2008 the system controller 101 calculates a combination position such that an adjacent tile A" 2105 overlaps the portion 2104 containing no image of the tile A' 2102. This tile A" 2105 is a resolution-converted tile positioned below the tile A' 2102. In step S2008, therefore, the tile A" 2105 is shifted upward by the portion 2104 containing no image by coordinate transformation.

A case in which the fixed-form image A is enlarged from the original size by resolution conversion will be explained next. As shown in FIG. 22B, in step S2003 a tile A 2201 contained in the fixed-form tile A is converted into a tile A' 2202 by resolution conversion. An image of this converted tile A' 2202 is larger than that of the original tile A 2201.

In this embodiment, in step S2004 the resolution converter 122 segments a portion extending from the size of the original tile A into other tiles, and transmits a plurality of segmented tiles A' 2203 to 2206 to the system controller 101. From these transmitted tiles, the system controller 101 rasterizes the enlarged fixed-form image into a raster file. This raster file is segmented into tiles and used in image combination by the system controller 101. The system controller 101 generates fixed-form image tile information after enlargement which contains the X- and Y-coordinates of the tiles and the storage addresses of these tiles in the RAM 102.

In step S2008, the system controller 101 calculates a coordinate position in the image B to which the resolution-converted, fixed-form image tile A' (X, Y) corresponds, thereby transforming the coordinates of the tile A' (X, Y).

In step S2009, on the basis of the combination position calculated after the reducing or enlarging process, a tile image C (tile image B) corresponding to each tile image A is selected.

The system controller 101 reads out corresponding tiles B (X, Y) from the image B. The number of the tiles B (X, Y) is 0, 1, 2, or 4 in accordance with the combination position of the fixed-form image tile A' (X, Y).

In this embodiment, the relationship between the image B and the position to which the tile A (X, Y) is to be combined is the same as shown in FIGS. 9 to 12 explained in the second embodiment.

That is, as shown in FIG. 9, when the fixed-form image tile A' (X, Y) exceeds the range of the image B to be combined, there is no corresponding tile B (X, Y), so no tile combination is necessary.

As shown in FIG. 10A, when the coordinates of the fixed-form image tile A' (X, Y) perfectly match those of a tile of the image B to be combined, one corresponding tile B (X, Y) is present. One corresponding tile B (X, Y) is sometimes present when the edge of an image is an object as shown in FIG. 10B or 10C.

As shown in FIG. 11A, when the X- or Y-coordinate of the fixed-form image tile A'. (X, Y) overlaps that of a tile of the image B to be combined, two corresponding tiles B (X, Y) are present.

As shown in FIG. 11B, two corresponding tiles B (X, Y) are also present when the fixed-form image tile A' (X, Y) and a tile of the image B to be combined do not overlap but exist on the edge of the image.

As shown in FIG. 12, when the coordinates of the fixed-form image tile A' (X, Y) and the coordinates of tiles of the image B to be combined do not overlap at all, four corresponding tiles B (X, Y) are present.

In this embodiment as explained above, when the tile image A of a fixed-form image is to be combined after resolution conversion, combination position coordinates of each reduced or enlarged tile image are calculated on the basis of region information of the tile image. On the basis of the calculated combination position coordinates, the coordinates of each tile image are transformed.

Accordingly, coordinate-transformed tile images can be combined in the same manner as in the third embodiment. This allows a high-level combining process including resolution conversion to be executed at high speed and low cost.

Other Embodiment

In each of the above embodiments, the combining process of the present invention is explained by using a digital composite machine. However, the present invention is also applicable to image processing-apparatuses such as a facsimile apparatus, printer, scanner, and the like.

In each of the above embodiments, two images stored in a storage section are combined. However, the present invention is not restricted to this combining process and can be applied to various image processing operations.

For example, form overlay printing is an application of the combining processes according to the third and fourth embodiments. That is, a PC or print server connected to the external interface 105 designates a form image stored in the external storage 132 and transmits printing data. The digital composite machine converts this printing data into raster data, reads out the designated form image from the external storage 132 before the step S1701 or S2001 is executed, and executes the combining process of the third or fourth embodiment. The combined image data is transmitted to the printer 130 and printed.

Since only tile images necessary for overlay printing can be stored as form images in the external storage and RAM and can be used, the speed of form overlay printing can be increased without increasing the cost of the apparatus.

Each of the flow charts shown in FIGS. 7, 13, 17, and 20 according to the embodiments is a combination of the processing by the system controller 101 and the processing by the image processor 110. In these flow charts, processes executed by the CPU of the system controller 101 are the tile segmenting process, combined image extracting process, packet generating process, and the like using software such as an image combining program. Processes executed by the image combiner 121 of the image processor 110 are the pixel-level combining process, packet transfer process, and the like using hardware such as OR circuits.

In this manner, in the above embodiments the process contents are clearly separated-between the system controller 101 and the, image processor 110. Also, when receiving a data packet from the system controller 101, the image processor 110 can execute image processing for the packet after that without being controlled by the system controller 101.

When processing is performed following each flow chart described above, therefore, the packet generating process or the like performed using software by the CPU and the combining process performed using hardware by the image combiner 121 can be executed for a plurality of tiles in parallel. Since the load of the combining process can be distributed to the CPU of the system controller 101 and to the image combiner 121 as a circuit of the image processor 110, it is possible to further increase the speed and reduce the cost.

The present invention is applicable not only to an image processing apparatus such as a digital composite machine but also to an information processing apparatus such as a PC. Even when this information processing apparatus has no dedicated hardware, a CPU and software running on a work RAM can execute the image combining process of the present invention.

That is, the present invention can also be completed by supplying a storage medium storing program codes of software for implementing the functions of the above embodiments to a system or apparatus and reading out and executing the program codes stored in the storage medium by a computer (or a CPU or MPU) of the system or apparatus.

In this case, the program codes read out from the storage medium implement the functions of the above embodiments, and the storage medium storing these program codes constitutes the invention. As this storage medium for supplying the program codes, it is possible to use, e.g., a floppy disk, hard disk, optical disk, magnetooptical disk, CD-ROM, CD-R, magnetic tape, nonvolatile memory card, and ROM. Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for combining a first raster image and a second raster image, comprising:
    a segmentation unit, arranged to segment the first raster image into plural segment images, each of which has plural pixels and a first predetermined size included in a first segmented image group, and to segment the second raster image into plural segmented images, each of which has plural pixels and a second predetermined size, included in a second segment image group;
    an addition unit, arranged to add first unique information to each segmented image of the first segmented image group to discriminate between the segmented images of the first segmented image group, and to add second unique information to each segmented image of the second segmented image group to discriminate between the segmented images of the second segmented image group;
    a determination unit, arranged to determine whether or not each segmented image of the first segmented image group includes an image to be combined with the second raster image, based on the pixels of each segmented image;
    an extraction unit, arranged to extract each segmented image of the first segmented image group which has the first predetermined size and is determined by said determination unit to include the image to be combined by said determination unit with the second raster image, and to extract each segmented image from the second segmented image group which has the second predetermined size and the added information corresponding to that of the extracted segmented image of the first segmented image group;
    a combination unit, arranged to combine the segmented image of the first segmented image group, which has the first predetermined size and is extracted by said extraction unit, with a corresponding segmented image of the second segmented image group, which has the second predetermined size and is extracted by said extraction unit; and
    a generation unit, arranged to generate a synthetic image, as the result of synthesis of the first and second raster images, from at least one image combined by said combination unit and at least one segmented image of the second segmented image group which is not extracted by said extraction unit.

2. The apparatus according to claim 1, wherein said segmentation unit generates the plural segmented images by segmenting the first and second raster images into rectangular regions having the first or second predetermined size.

3. The apparatus according to claim 1, wherein said extraction unit extracts each segmented image of the first segmented image group that contains a pixel having a color different from a background color, as the image to be combined with the second raster image.

4. The apparatus according to claim 1, further comprising a data packet generation unit arranged to generate for each one of the extracted images a data packet containing the one segmented image extracted by said extraction unit and position information of the one segmented image.

5. The apparatus according to claim 4, wherein if a combining process of said combination unit is not executed in a normal fashion, said data packet generation unit again generates the data packet of each segmented image extracted by said extraction unit related to the combining process that was not executed normally.

6. An image processing method of combining a first raster image and a second raster image, comprising the steps of:
    segmenting the first raster image into plural segment images, each of which has plural pixels and a first predetermined size, included in a first segmented image group, and segmenting the second raster image into plural segmented images, each of which has plural pixels and a second predetermined size, included in a second segment image group;
    adding first unique information to each segmented image of the first segmented image group to discriminate between the segmented images of the first segmented image group, and adding second unique information to each segmented image of the second segmented image group to discriminate between the segmented images, of the second segmented image group;

determining whether or not each segmented image of the first segmented image group includes an image to be combined with the second raster image, based on the pixels of each segmented image;

extracting each segmented image of the first segmented image group which has the first predetermined size and is determined to include the image to be combined in the determining step with the second raster image, and extracting each segmented image from the second segmented image group which has the second predetermined size and the added information corresponding to that of the extracted segmented image of the first segmented image group;

combining the segmented image of the first segmented image group, which has the first predetermined size and is extracted with a corresponding segmented image of the second segmented image group which has the second predetermined size and is extracted; and generating a synthetic image as the result of synthesis of the first and second raster images, from at least one combined image and at least one segmented image of the second segmented image group which is not extracted.

7. The method according to claim 6, wherein the segmenting step generates the plural segmented images by segmenting the first and second raster images into rectangular regions having the first or second predetermined size.

8. The method according to claim 6, wherein the extracting step extracts each segmented image of the first segmented image group that contains a pixel having a color different from a background color, as the image to be combined with the second raster image.

9. The method according to claim 6, further comprising the step of generating for each one of the extracted images a data packet containing the one segmented image extracted and position information of the one segmented image.

10. The method according to claim 9, wherein if a combining process in the combining step is not executed in a normal fashion, the generating step again generating the data packet of each segmented image extracted related to the combining process that was not executed normally.

11. A computer program product stored on a computer readable medium, the program comprising computer program code for an image processing method of combining a first raster image and a second raster image, said method comprising the steps of:

segmenting the first raster image into plural segment images, each of which has plural pixels and a first predetermined size, included in a first segmented image group, and segmenting the second raster image into plural segmented images, each of which has plural pixels and a second predetermined size, included in a second segment image group;

adding first unique information to each segmented image of the first segmented image group to discriminate between the segmented images of the first segmented image group, and adding second unique information to each segmented image of the second segmented image group to discriminate between the segmented images of the second segmented image group;

determining whether or not each segmented image of the first segmented image group includes an image to be combined with the second raster image, based on the pixels of each segmented image;

extracting each segmented image of the first segmented image group which has the first predetermined size and is determined to include the image to be combined in the determining step with the second raster image, and extracting each segmented image from the second segmented image group which has the second predetermined size and the added information corresponding to that of the extracted segmented image of the first segmented image group;

combining the segmented image of the first segmented image group, which has the first predetermined size and is extracted, with the corresponding segmented image of the second segmented image group, which has the second predetermined size and is extracted; and generating a synthetic image, as the result of synthesis of the first and second raster images, from at least one combined image and at least one segmented image of the second segmented image group which is not extracted.

12. The product according to claim 11, wherein the segmenting step generates the plural segmented images by segmenting the first and second raster images into rectangular regions having the first or second predetermined size.

13. The product according to claim 11, wherein the extracting step extracts each segmented image of the first segmented image group that contains a pixel having a color different from a background color, as the image to be combined with the second raster image.

14. The product according to claim 11, wherein said method further comprises the step of generating for each one of the extracted images a data packet containing the one segmented image extracted and position information of the one segmented image.

15. The product according to claim 14, wherein if a combining process in the combining step is not executed in a normal fashion, the generating step again generating the data packet of each segmented image extracted related to the combining process that was not executed normally.

* * * * *

UNITED STATES PATENT AND TRADEMARK OFFICE
CERTIFICATE OF CORRECTION

| | |
|---|---|
| PATENT NO. | : 7,110,007 B2 |
| APPLICATION NO. | : 10/180051 |
| DATED | : September 19, 2006 |
| INVENTOR(S) | : Masayuki Odagawa |

Figure 3:
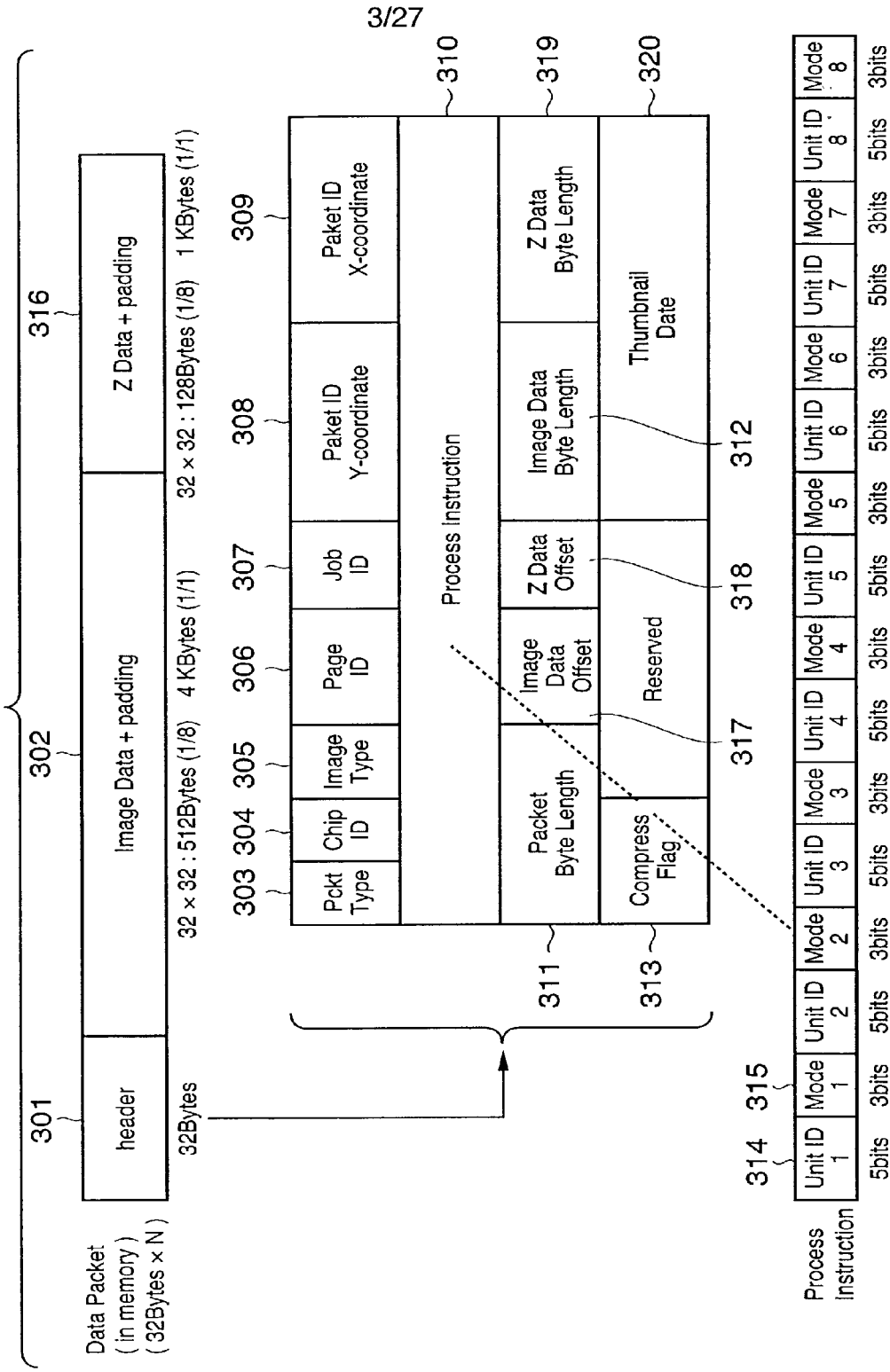
FIGS. 3 and 4 are views showing the formats of data packets.

It is certified that error appears in the above-identified patent and that said Letters Patent is hereby corrected as shown below:

SHEET 3:

FIG. 3, "PAKET ID" (both occurrences) should read --PACKET ID--.

COLUMN 4:

Line 12, "controller 161" should read --controller 101--.

COLUMN 8:

Line 43, "date" should read --data--.

COLUMN 10:

Line 31, "thee" should read --the--.
    Line 38, "with-the" should read --with the--.

COLUMN 15:

Line 12, "in to" should read --into--.

COLUMN 16:

Line 65, "tile A" should read --tile A'--.

Figure 21B:
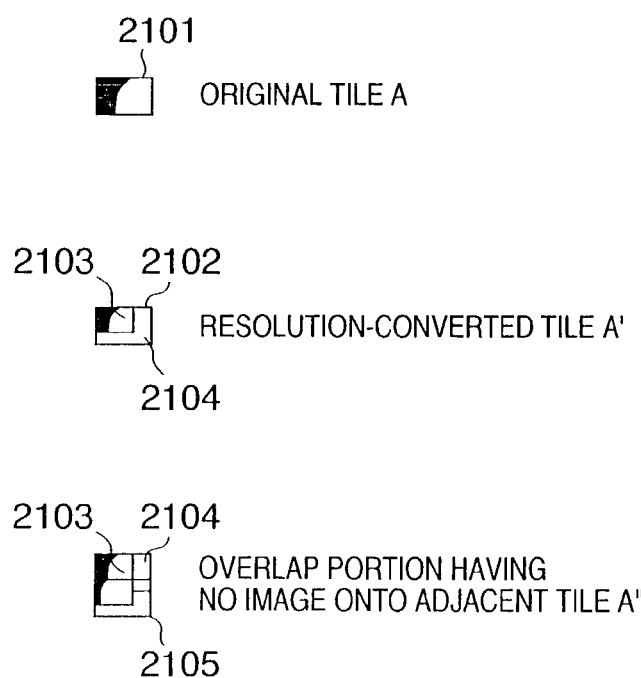
Figure 23:
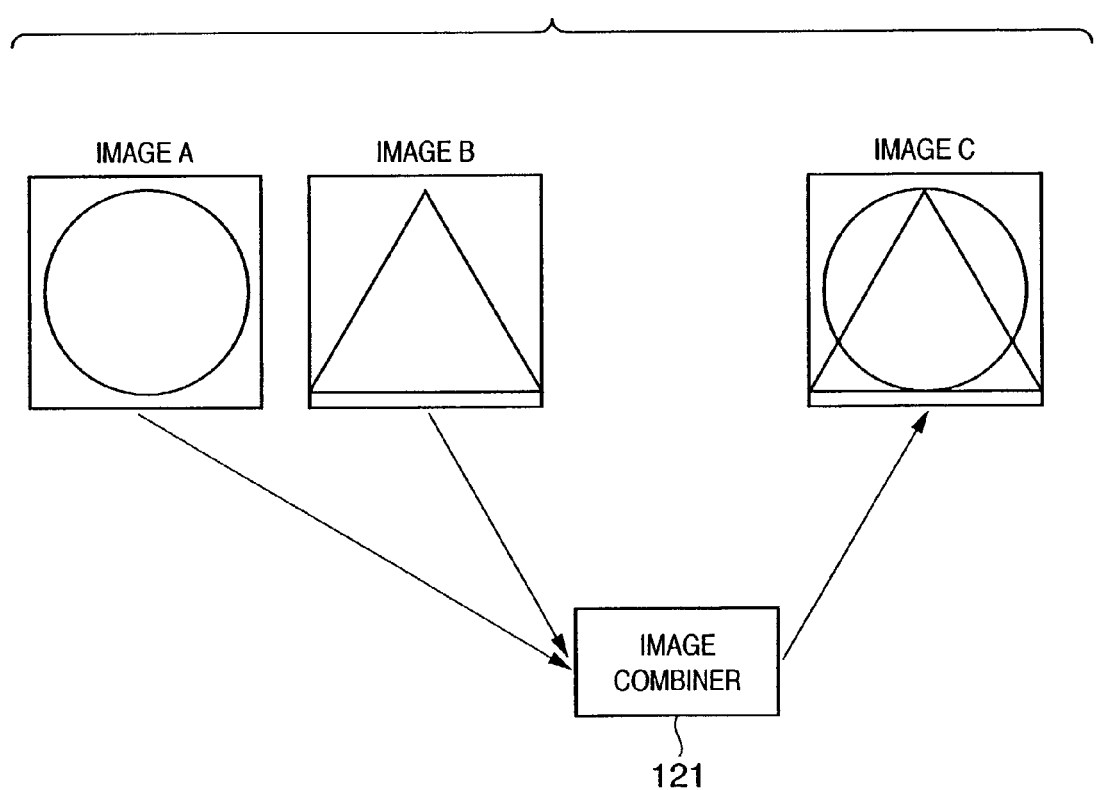
FIG. 23 is a view for explaining the relationship between images before and after conventional combination.

COLUMN 17:

Line 1, "FIG. 211B," should read --FIG. 21B,--.
    Line 9, "FIG. 211B," should read --FIG. 21B,--.
    Line 65, "tile A'." should read --tile A'--.

UNITED STATES PATENT AND TRADEMARK OFFICE
CERTIFICATE OF CORRECTION

PATENT NO. : 7,110,007 B2
APPLICATION NO. : 10/180051
DATED : September 19, 2006
INVENTOR(S) : Masayuki Odagawa It is certified that error appears in the above-identified patent and that said Letters Patent is hereby corrected as shown below:

COLUMN 19:

Line 30, "ments" should read --ments which--.
Line 57, "size" should read --size,--.

COLUMN 20:

Line 66, "images," should read --images--.

COLUMN 21:

Line 16, "extracted" should read --extracted,--.
Line 17, "group" should read --group,--.

Signed and Sealed this

Twenty-ninth Day of April, 2008

JON W. DUDAS
*Director of the United States Patent and Trademark Office*